United States Patent
Youtz et al.

(10) Patent No.: US 12,231,955 B2
(45) Date of Patent: Feb. 18, 2025

(54) SYSTEMS AND METHODS FOR INSTRUCTING A USER EQUIPMENT TO UTILIZE A FIFTH GENERATION (5G) NETWORK INSTEAD OF A WIRELESS NETWORK

(71) Applicant: Verizon Patent and Licensing Inc., Basking Ridge, NJ (US)

(72) Inventors: Andrew E. Youtz, Princeton, NJ (US); Lily Zhu, Parsippany, NJ (US); Balaji L. Raghavachari, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 565 days.

(21) Appl. No.: 17/304,211

(22) Filed: Jun. 16, 2021

(65) Prior Publication Data

US 2021/0314818 A1   Oct. 7, 2021

Related U.S. Application Data

(63) Continuation-in-part of application No. 16/825,408, filed on Mar. 20, 2020, now Pat. No. 11,528,651.

(51) Int. Cl.
| | |
|---|---|
| *H04W 28/08* | (2023.01) |
| *H04W 24/10* | (2009.01) |
| *H04W 28/086* | (2023.01) |
| *H04W 36/12* | (2009.01) |
| *H04W 76/10* | (2018.01) |

(52) U.S. Cl.
CPC ....... *H04W 28/0865* (2023.05); *H04W 24/10* (2013.01); *H04W 36/125* (2018.08); *H04W 76/10* (2018.02)

(58) Field of Classification Search
CPC ...... H04W 28/08; H04W 76/10; H04W 24/10
See application file for complete search history.

(56) References Cited

U.S. PATENT DOCUMENTS

| | | | |
|---|---|---|---|
| 10,085,198 B2 | 9/2018 | Kavoussi et al. | |
| 10,602,417 B2 | 3/2020 | Vemuri et al. | |
| 2014/0080450 A1* | 3/2014 | Gupta | H04W 76/10 455/411 |
| 2015/0003415 A1* | 1/2015 | Muley | H04W 36/0022 370/331 |
| 2016/0080998 A1* | 3/2016 | Fukuta | H04W 48/20 370/331 |
| 2017/0208488 A1 | 7/2017 | Hwang et al. | |
| 2017/0339725 A1* | 11/2017 | Cho | H04W 76/20 |
| 2019/0028946 A1* | 1/2019 | Gandhi | H04W 28/086 |
| 2019/0281507 A1* | 9/2019 | Rahat | H04W 36/14 |

(Continued)

*Primary Examiner* — Brenda H Pham

(57) ABSTRACT

A network device, of a fifth generation (5G) radio access network, may establish a connection or a session with a user equipment connected to a Wi-Fi network. The network device may determine an indicator indicating whether a 5G network preference is in effect based on a subscription of the user equipment and may provide the indicator to the user equipment. The network device may maintain the connection or the session with the user equipment when the indicator indicates that the Wi-Fi network is not preferred for Wi-Fi offload and may receive traffic from the user equipment when the indicator indicates that the Wi-Fi network is not preferred for Wi-Fi offload.

20 Claims, 17 Drawing Sheets

(56) References Cited

U.S. PATENT DOCUMENTS

2021/0112488 A1\* 4/2021 Meredith .............. H04W 12/06
2021/0204175 A1 7/2021 Rangaraju et al.
2021/0274416 A1 9/2021 Jendli et al.

\* cited by examiner

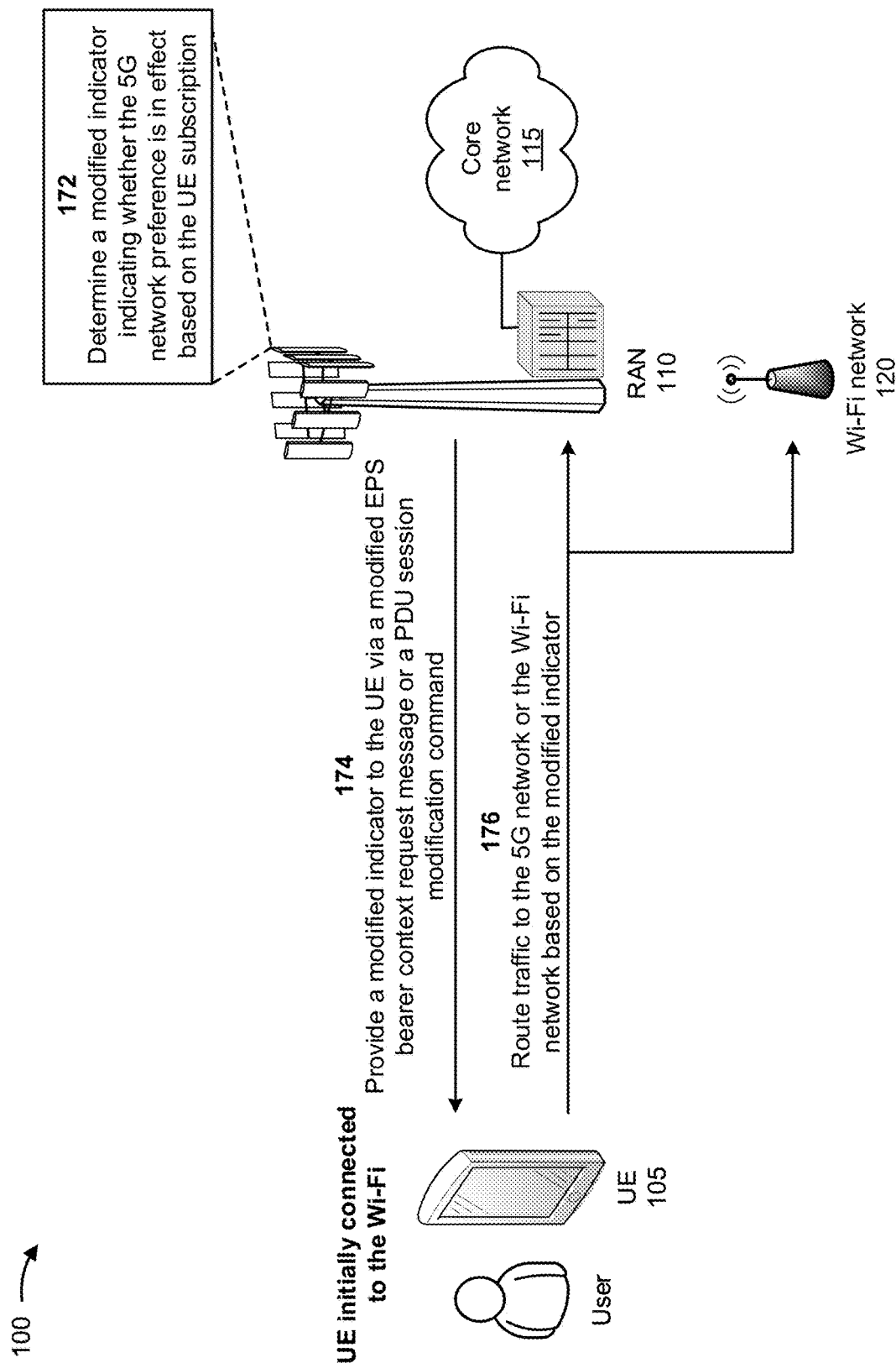

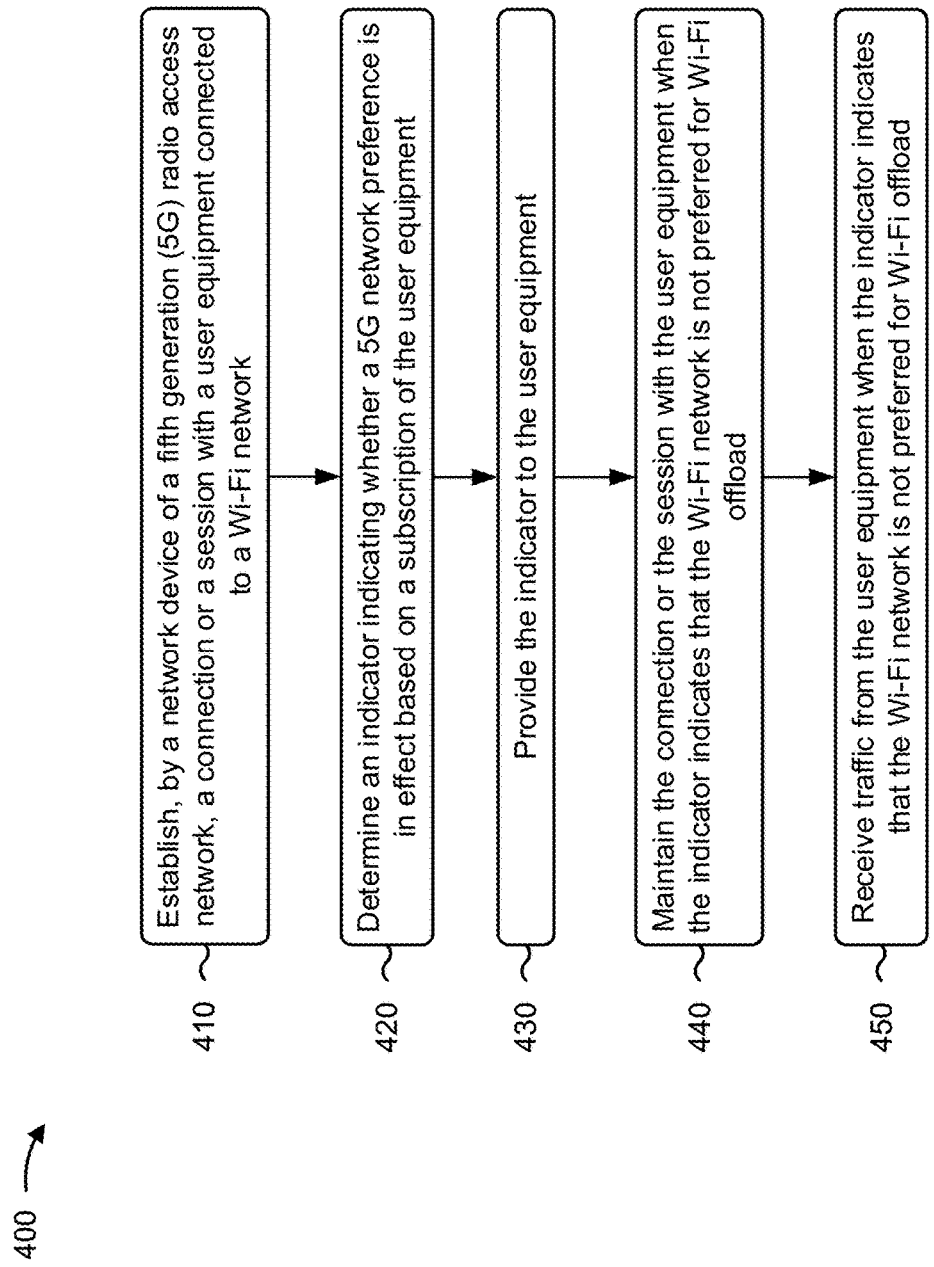

SYSTEMS AND METHODS FOR INSTRUCTING A USER EQUIPMENT TO UTILIZE A FIFTH GENERATION (5G) NETWORK INSTEAD OF A WIRELESS NETWORK

CROSS-REFERENCE TO RELATED APPLICATION

This patent application is a continuation-in-part of prior U.S. patent application Ser. No. 16/825,408, filed on Mar. 20, 2020, and entitled "SYSTEMS AND METHODS FOR PRIORITIZING USER EQUIPMENT ACCESS TO FIFTH GENERATION (5G) ULTRA-WIDEBAND NETWORKS AND WIRELESS NETWORKS." The disclosure of the prior application is considered part of and is incorporated by reference into this patent application.

BACKGROUND

Fifth generation (5G) user equipment (UEs) in densely populated areas (e.g., venues, cities, and/or the like) may attain very large uplink and downlink speeds when operating in 5G coverage.

BRIEF DESCRIPTION OF THE DRAWINGS

FIG. 4 is a flow chart of an example process for instructing a UE to utilize a 5G network instead of a wireless network.

DETAILED DESCRIPTION OF PREFERRED EMBODIMENTS

Figure 1A:
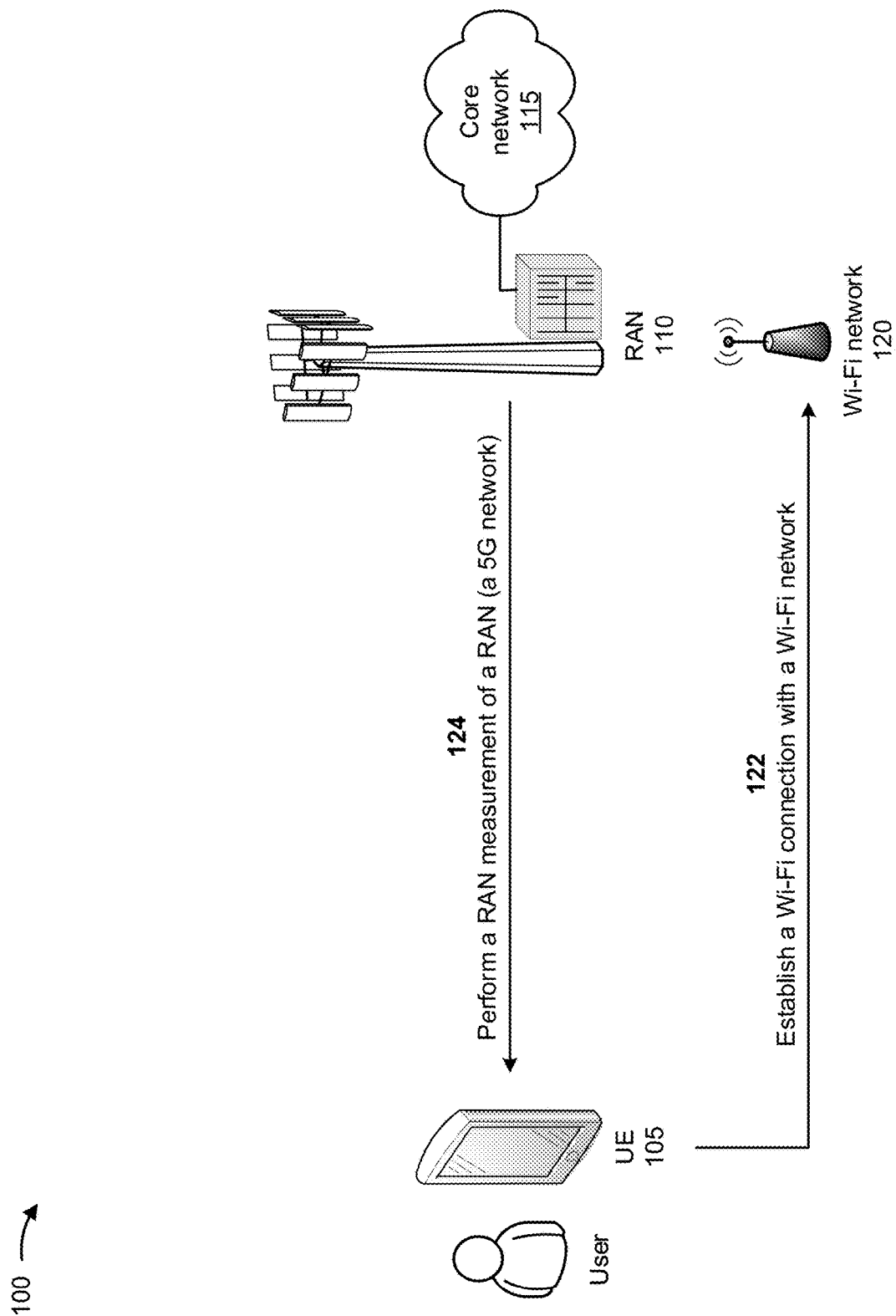
FIGS. 1A-1N are diagrams of one or more example implementations described herein.

The following detailed description of example implementations refers to the accompanying drawings. The same reference numbers in different drawings may identify the same or similar elements.

Current UEs, by default, may provide all data traffic over a Wi-Fi network for the purpose of cellular offload to Wi-Fi to maximize fourth generation (4G) long-term evolution (LTE) capacity for real needs. However, in an environment where every UE is using a Wi-Fi network, data traffic may be congested since there is a limited bandwidth on the Wi-Fi network, even while abundant bandwidth from a fifth generation (5G) radio access network goes unutilized. In addition, any services that are specific to a 5G radio access network will not be available to the user when Internet traffic automatically connects to Wi-Fi. Since UEs may prioritize Wi-Fi over 5G for data traffic, users of the UEs may be prevented from accessing the speed and new services associated with a 5G radio access network. Thus, Wi-Fi offloading behavior of current UEs may inefficiently utilize and consume computing resources (e.g., processing resources, memory resources, communication resources, and/or the like), networking resources, and/or the like by incorrectly routing traffic to Wi-Fi networks, overloading Wi-Fi networks, not enabling discovery and routing of traffic to a 5G radio access network with abundant resources and additional services, and/or the like.

Furthermore, for stadiums and venues, network services, applications, and experiences are provided that require 5G connectivity. In certain stadium and venue settings, UEs need to prefer the 5G radio access network over a Wi-Fi network when the UEs are associated with 5G subscribers. Currently, there is no mechanism for the 5G radio access network to signal to a UE that the 5G radio access network may be preferred over a Wi-Fi network for a 5G subscriber. The UE needs this information to make an intelligent decision on whether to use the 5G radio access network or the Wi-Fi network in the stadium and/or venue.

Some implementations described herein provide a network device, of a 5G radio access network, that instructs a UE to utilize the 5G radio access network instead of a wireless network (e.g., a Wi-Fi network). For example, the network device may establish a connection or a session with a user equipment connected to a Wi-Fi network and may determine an indicator indicating whether a 5G network preference is in effect based on a subscription of the user equipment. The network device may provide the indicator to the user equipment and may maintain the connection or the session with the user equipment when the indicator indicates that the Wi-Fi network is not preferred for Wi-Fi offload. The network device may receive traffic from the user equipment when the indicator indicates that the Wi-Fi network is not preferred for Wi-Fi offload.

In this way, the network device of the 5G RAN instructs the UE to utilize the 5G RAN instead of the wireless network. For example, the network device may provide an indicator (e.g., via an operator reserved protocol configuration options (PCO) container) to the UE. The network device may push the indicator to the UE during a packet data network (PDN) connection setup for LTE/5G New Radio (NR) non-standalone (NSA) and a PDU session establishment for 5G NR standalone (SA). The UE may request the operator reserved PCO container in a PDN connectivity request message (e.g., for LTE/5G NR NSA) or a PDU session establishment request message (e.g., for 5G NR SA). The network device may respond with an activate default evolved packet system (EPS) bearer context request message (e.g., for LTE/5G NR NSA) or a PDU session establishment accept message (e.g., for 5G NR SA). Thus, the network device and the UE best utilize available computing resources, networking resources, and/or the like that would otherwise be inefficiently utilized and consumed incorrectly routing traffic to Wi-Fi networks, overloading Wi-Fi networks, not enabling discovery and routing of traffic to the 5G RAN, and/or the like.

FIGS. 1A-1N are diagrams of one or more example implementations 100 described herein. As shown in FIG. 1A, a UE 105 (e.g., a mobile phone, a computer, and/or the like) may be associated with a 5G RAN 110, a core network 115, and a Wi-Fi network 120. RAN 110 may include one or more network devices (e.g., eNodeBs, gNodeBs, and/or the like) that provide access to core network 115. Core network 115 may include an example architecture of a 4G core network, a 5G core network included in a 5G wireless telecommunications system, and/or the like. Wi-Fi network 120 may include a device that generates a local area network (LAN) to which the UE 105 may connect through a wireless standard, such as Wi-Fi, BLUETOOTH, and/or the like.

As further shown in FIG. 1A, and by reference number 122, UE 105 may establish a Wi-Fi connection with a Wi-Fi network 120. For example, UE 105 may establish a Wi-Fi connection with Wi-Fi network 120 so that UE 105 may transmit data to and/or receive data from a network (e.g., the Internet) when Wi-Fi is available for offload to UE 105. In some implementations, UE 105 may establish the Wi-Fi connection to conserve battery resources associated with UE 105, to limit data charges associated with cellular data connections, and/or the like.

As further shown in FIG. 1A, and by reference number 124, UE 105 may perform a RAN measurement of RAN 110 (e.g., a 5G RAN). In some implementations, UE 105 may perform a RAN measurement of RAN 110 by utilizing third generation partnership project (3GPP)-based standard UE measurement procedures (e.g., for measuring a 5G signal). UE 105 may connect to RAN 110 as an anchor and may perform the RAN measurement from RAN 110.

In some implementations, UE 105 may periodically connect to RAN 110 (e.g., about every 1 minute, about every 5 minutes, and/or the like) and may periodically perform the RAN measurement. A frequency of the periodic connections may be configurable by a user of UE 105 and/or automatically by UE 105 (e.g., to conserve battery power of UE 105). In some implementations, UE 105 may periodically establish a connection with RAN 110 so that RAN 110 may perform a measurement (e.g., an LTE bandwidth one (B1) measurement) of a signal strength of RAN 110 with respect to UE 105. The LTE B1 measurement may be triggered when a metric associated with a neighboring inter-system cell satisfies a particular threshold associated with the metric. In this case, performing the LTE B1 measurement may cause RAN 110 to measure a metric (e.g., a signal strength) associated with a 5G signal generated by RAN 110, and to compare the metric to the particular threshold.

Figure 1B:
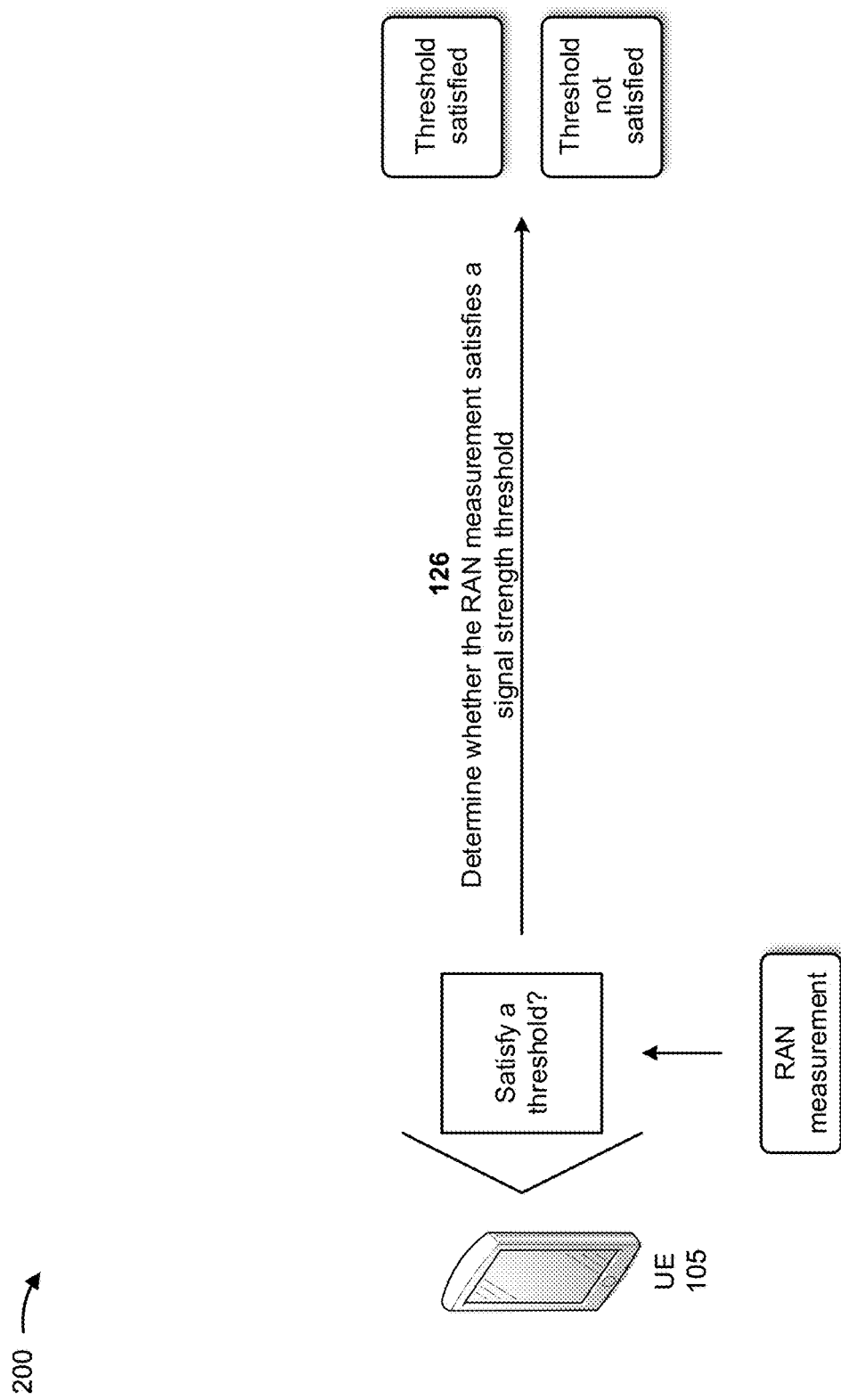

As shown in FIG. 1B, and by reference number 126, UE 105 may determine whether the RAN measurement satisfies a signal strength threshold. In some implementations, the RAN measurement may be a reference signal received power (RSRP) measurement. In such implementations, where the RAN measurement is an RSRP measurement of a 5G signal, UE 105 may determine whether the RAN measurement satisfies a 5G threshold, such as an evolved-UNITS terrestrial radio access network (E-UTRAN) new radio-dual connectivity (EN-DC) add threshold, a new radio-dual connectivity (NR-DC) add threshold, a new radio-carrier aggregation (NR-CA) add threshold, and/or the like. If UE 105 determines that the RAN measurement satisfies the signal strength threshold, UE 105 may determine that RAN 110 is available to UE 105. If UE 105 determines that the RAN measurement fails to satisfy the signal strength threshold, UE 105 may determine that RAN 110 is not available to UE 105.

Figure 1C:
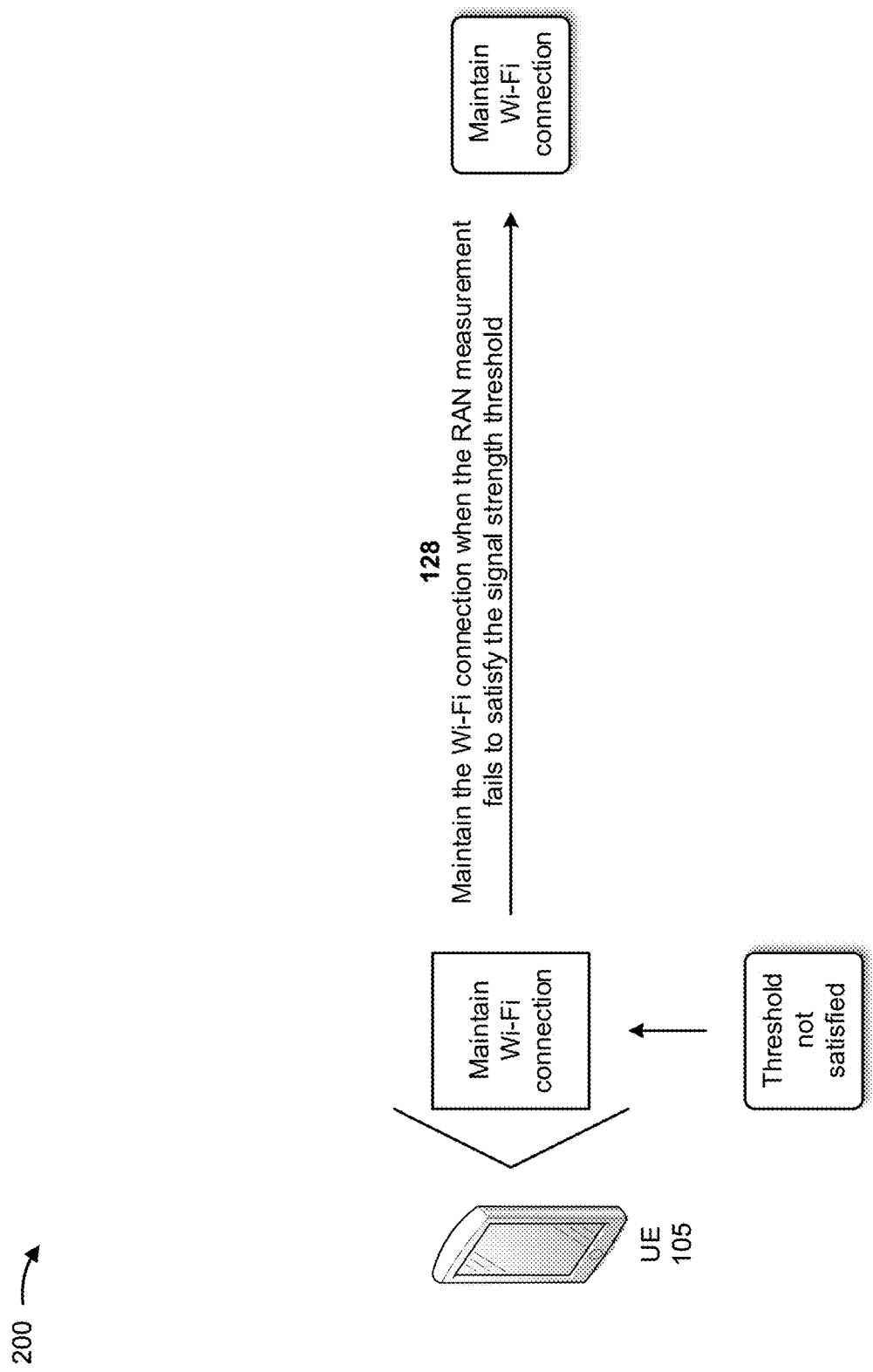

As shown in FIG. 1C, and by reference number 128, UE 105 may maintain the Wi-Fi connection when the RAN measurement fails to satisfy the signal strength threshold. For example, since the RAN measurement fails to satisfy the signal strength threshold, UE 105 may determine that RAN 110 is unavailable. Thus, UE 105 may remain connected to the Wi-Fi network in order to conserve battery life of UE 105, to limit data charges associated with cellular data connections, and/or the like. In some implementations, while maintaining the Wi-Fi connection, UE 105 may periodically perform additional measurements associated with RAN 110 and may compare the additional measurements with the signal strength threshold.

Figure 1D:
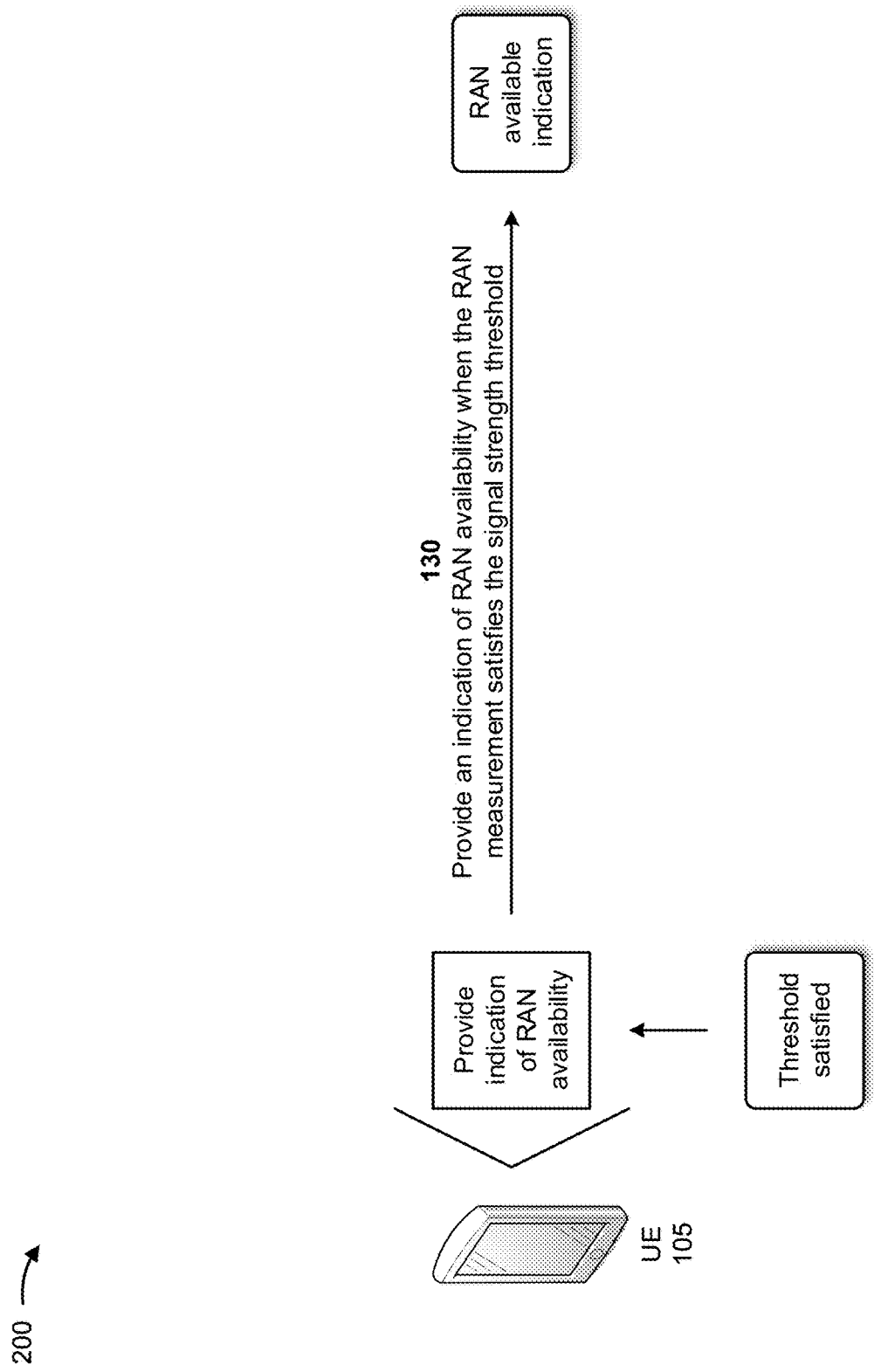

As shown in FIG. 1D, and by reference number 130, UE 105 may provide an indication of RAN 110 availability when the RAN measurement satisfies the signal strength threshold. For example, UE 105 may provide the indication of RAN availability to a user of UE 105 via a user interface. In some implementations, the user interface may include information requesting the user to choose whether to utilize a 5G connection (e.g., via RAN 110) or to continue utilizing the Wi-Fi connection (e.g., via Wi-Fi network 120). In some implementations, the user interface may include additional information that enables the user to make an informed decision regarding selection of the 5G connection or the Wi-Fi connection. For example, the user interface may include information identifying signal qualities, data transfer speeds, and/or the like associated with the 5G connection and/or the Wi-Fi connection, potential battery utilization that may result from using the 5G connection versus the Wi-Fi connection, and/or the like.

Figure 1E:
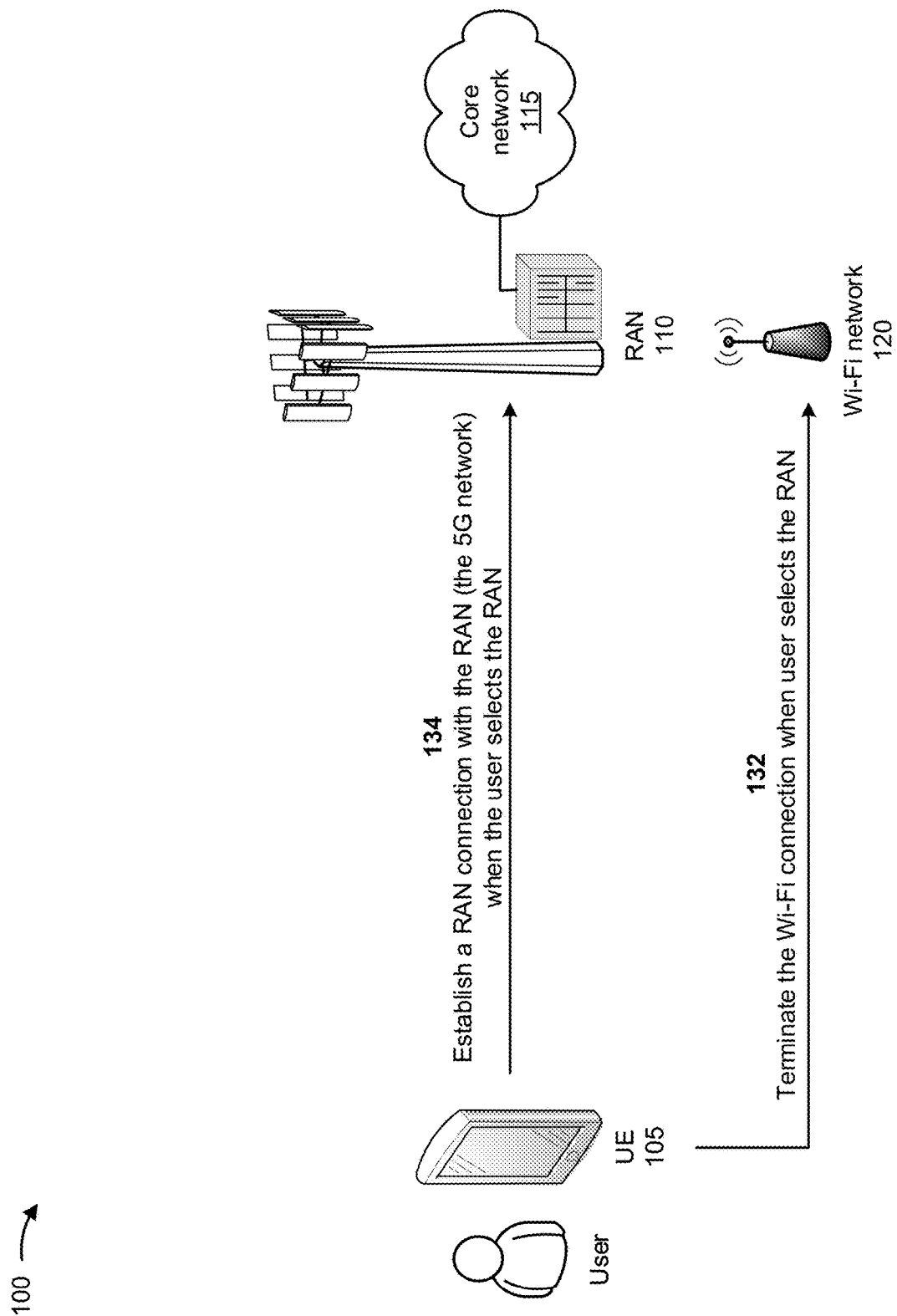

As shown in FIG. 1E, and by reference number 132, UE 105 may terminate the Wi-Fi connection (e.g., with Wi-Fi network 120) when the user elects to utilize RAN 110 (e.g., the 5G RAN). In some implementations, UE 105 may terminate the Wi-Fi connection by disconnecting from Wi-Fi network 120, by disabling Wi-Fi connectivity of UE 105, and/or the like.

As further shown in FIG. 1E, and by reference number 134, UE 105 may establish a RAN connection with RAN 110 when the user elects to utilize RAN 110 (e.g., the 5G RAN). In some implementations, UE 105 may utilize the RAN connection, that was previously established for performing the RAN measurement (e.g., as described above in connection with FIG. 1A), as the RAN connection with RAN 110. In some implementations, if UE 105 continues to utilize the previously-established RAN connection for performing RAN measurements, UE 105 may establish another RAN connection in parallel with the previously-established RAN connection. Thereafter, UE 105 may receive data from and/or transmit data to a data network (e.g., the Internet) via the RAN connection rather than the wireless connection.

Figure 1F:
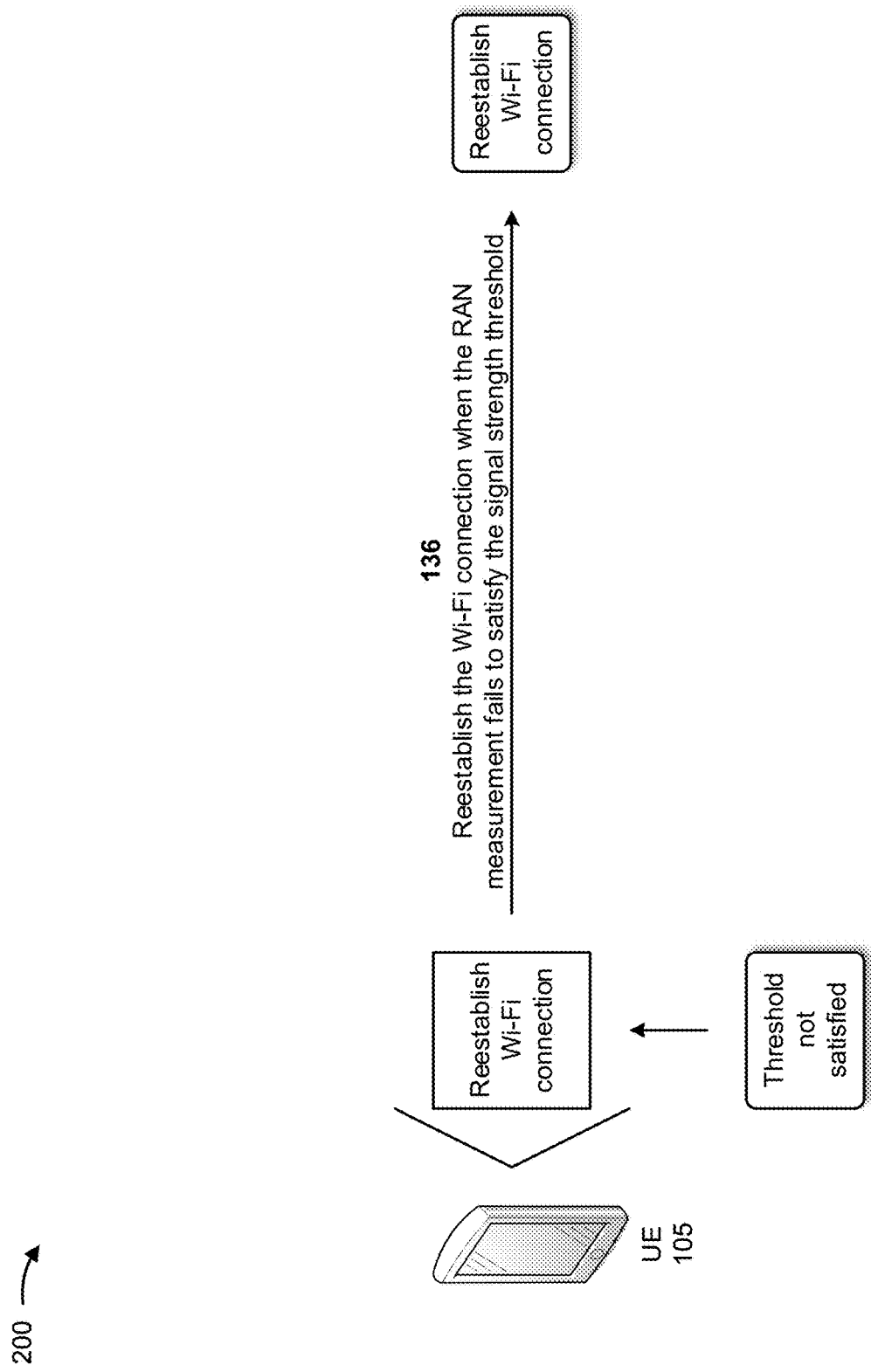

As shown in FIG. 1F, and by reference number 136, UE 105 may reestablish the Wi-Fi connection when the RAN measurement fails to satisfy the signal strength threshold. In some implementations, UE 105 may perform another RAN measurement associated with RAN 110 after establishing the RAN connection with RAN 110 and may determine that the other RAN measurement fails to satisfy the signal strength threshold. UE 105 may terminate the RAN connection with RAN 110 based on determining that the other RAN measurement fails to satisfy the signal strength threshold, and may reestablish the Wi-Fi connection with Wi-Fi network 120 based on determining that the other RAN measurement fails to satisfy the signal strength threshold. In some implementations, UE 105 may reestablish the Wi-Fi connection when battery power of UE 105 does not satisfy a threshold. For example, if the battery power of UE 105 decreases below a particular threshold power level, UE 105 may automatically terminate the RAN connection with RAN 110 and may reestablish the Wi-Fi connection with Wi-Fi network 120. Alternatively, UE 105 may provide, to the user of UE 105, a notification indicating that the user should switch to the Wi-Fi connection due to a low battery power level. The user may then cause UE 105 to terminate the RAN connection with RAN 110 and reestablish the Wi-Fi connection with Wi-Fi network 120.

Figure 1G:
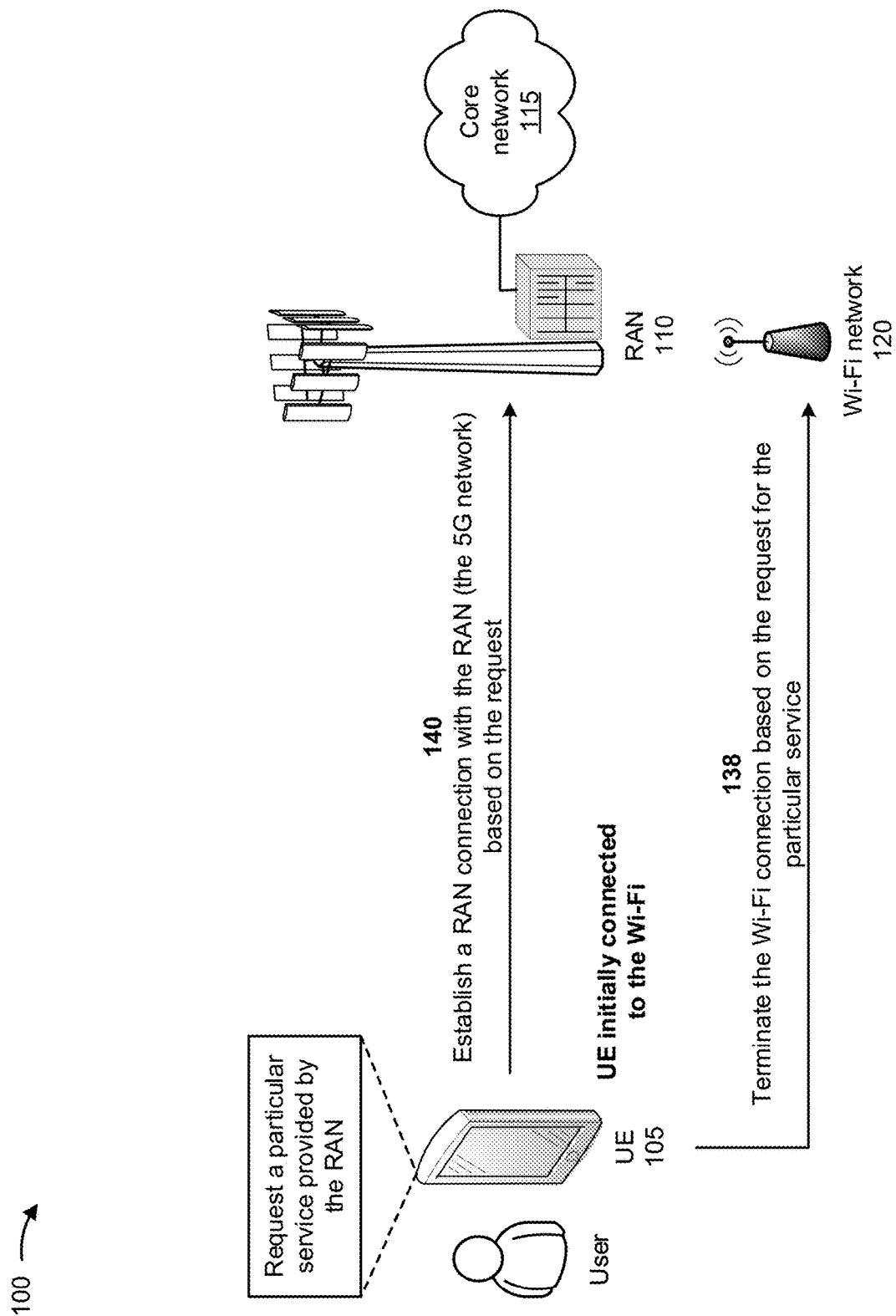

As shown in FIG. 1G, the user of UE 105 may utilize UE 105 to request a particular service provided by RAN 110 and/or core network 115. In some implementations, the particular service may include a 5G service that is best provided by RAN 110 and/or core network 115, such as an augmented reality service, a virtual reality service, a video upload service, and/or the like.

As further shown in FIG. 1G, and by reference number 138, UE 105 may terminate the Wi-Fi connection based on the request for a particular service. In some implementations, the user may cause UE 105 to request the particular service provided by RAN 110 while UE 105 is connected to Wi-Fi network 120, and UE 105 may terminate the Wi-Fi connection based on the request. For example, the user may access a video upload application provided by UE 105 and associated with a video upload service offered by core network 115. Since the video upload service is offered by core network 115, UE 105 may terminate the Wi-Fi connection in order to connect to core network 115 via RAN 110. Alternatively, UE 105 may utilize the Wi-Fi connection to access the video upload service from core network 115, but the Wi-Fi connection may not provide the video upload service as efficiently as RAN 110 (e.g., the video uploads may be delayed).

As further shown in FIG. 1G, and by reference number 140, UE 105 may establish a RAN connection with RAN 110 based on the request. In some implementations, UE 105 may use a specific access point name (APN) to route traffic (e.g., the request for the particular service), via the RAN connection, to RAN 110. For example, UE 105 may be pre-configured with network rules that instruct UE 105 to utilize the specific APN for the particular service. In some implementations, applications of UE 105 that utilize the particular service may be digitally signed for access control in RAN 110. When an application that utilizes the particular service satisfies a network rule defined for the particular service, and the application starts to use a wireless connection, the network rule may instruct UE 105 to route traffic (e.g., the request for the particular service) to the specific APN, via an LTE attach procedure, a 5G registration and protocol data unit (PDU) session establishment request message to the specific APN, and/or the like.

Figure 1H:
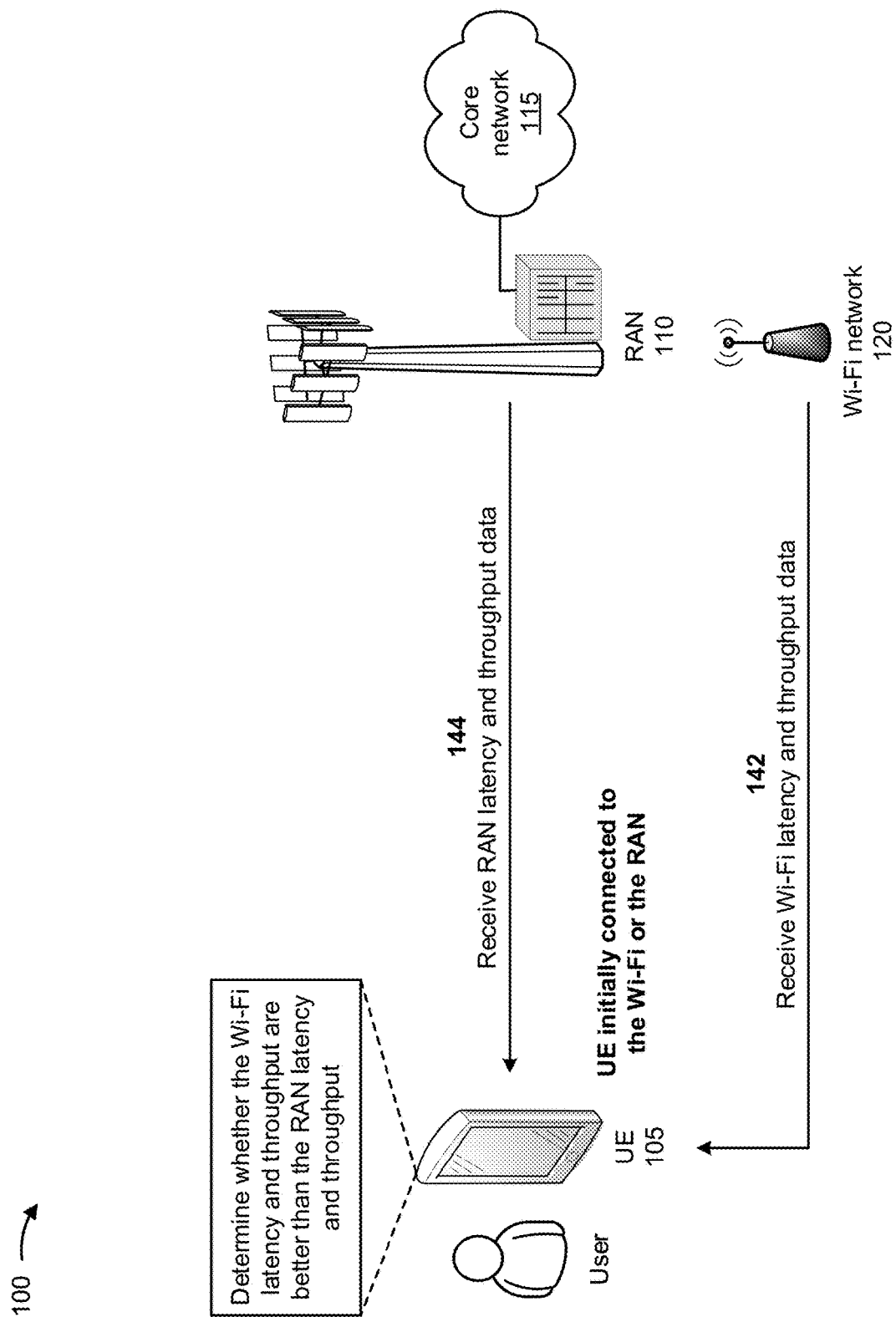

As shown in FIG. 1H, and by reference number 142, UE 105 may receive Wi-Fi latency data and Wi-Fi throughput data from Wi-Fi network 120. The Wi-Fi latency data may include data identifying delays associated with Wi-Fi network 120, the Wi-Fi connection, and/or the Wi-Fi network. The Wi-Fi throughput data may include data identifying a quantity of data transferred from Wi-Fi network 120, the Wi-Fi connection, and/or Wi-Fi network 120 at a particular time. In some implementations, UE 105 may periodically receive the Wi-Fi latency data and/or the Wi-Fi throughput data, may continuously receive the Wi-Fi latency data and/or the Wi-Fi throughput data, may receive the Wi-Fi latency data and/or the Wi-Fi throughput data based on a request, and/or the like. UE 105 may store the Wi-Fi latency data and the Wi-Fi throughput data in a data structure (e.g., a database, a table, a list, and/or the like) associated with UE 105. In some implementations, UE 105 may periodically monitor a wireless signal associated with Wi-Fi network 120 and may determine signal-to-noise ratio (SNR) and a received signal strength indicator (RSSI) for the wireless signal. In some implementations, UE 105 may provide ping commands to Wi-Fi network 120 to determine the Wi-Fi latency data and the Wi-Fi throughput data associated Wi-Fi network 120.

In some implementations, UE 105 may determine other metrics, key performance indicators, and/or the like, for the wireless signal. UE 105 may determine whether to establish and/or terminate a Wi-Fi connection based on the other metrics, key performance indicators, and/or the like, as described below.

As further shown in FIG. 1H, and by reference number 144, UE 105 may receive RAN latency data and RAN throughput data from RAN 110. The RAN latency data may include data identifying delays associated with RAN 110 and/or the RAN connection. The RAN throughput data may include data identifying a quantity of data transferred from RAN 110 and/or the RAN connection at a particular time. In some implementations, UE 105 may periodically receive the RAN latency data and/or the RAN throughput data, may continuously receive the RAN latency data and/or the RAN throughput data, may receive the RAN latency data and/or the RAN throughput data based on a request, and/or the like. UE 105 may store the RAN latency data and the RAN throughput data in a data structure (e.g., a database, a table, a list, and/or the like) associated with UE 105. In some implementations, UE 105 may provide ping commands to RAN 110 to determine the RAN latency data and the RAN throughput data associated with RAN 110.

In some implementations, UE 105 may periodically monitor a RAN signal associated with RAN 110 and may determine an SNR and a reference signal received power (RSRP) for the RAN signal. Additionally, or alternatively, UE 105 may determine other metrics, key performance indicators, and/or the like, for the RAN signal. In some implementations, UE 105 may determine whether to establish and/or terminate a RAN connection based on the other metrics, key performance indicators, and/or the like, as described below.

As further shown in FIG. 1H, UE 105 may then determine whether the Wi-Fi latency data and Wi-Fi throughput data are better than the RAN latency data and RAN throughput data. In some implementations, if the Wi-Fi latency data is better than the RAN latency data (e.g., the Wi-Fi latency is less than the RAN latency) and the Wi-Fi throughput data is better than the RAN throughput data (e.g., the Wi-Fi throughput is greater than the RAN throughput), UE 105 may determine that the Wi-Fi latency data and Wi-Fi throughput data are better than the RAN latency data and RAN throughput data. Alternatively, if the Wi-Fi latency data is not better than the RAN latency data (e.g., the Wi-Fi latency is more than the RAN latency) or the Wi-Fi throughput data is not better than the RAN throughput data (e.g., the Wi-Fi throughput is less than the RAN throughput), UE 105 may determine that the Wi-Fi latency data and Wi-Fi throughput data are not better than the RAN latency data and RAN throughput data.

In some implementations, if the SNR for the wireless signal is better than the SNR for the RAN signal (e.g., the SNR for the wireless signal is greater than the SNR for the RAN signal) and the RSSI for the wireless signal is better than the RSRP for the RAN signal (e.g., the RSSI for the wireless signal is greater than the RSRP for the RAN signal), UE 105 may determine that the Wi-Fi latency data and Wi-Fi throughput data are better than the RAN latency data and RAN throughput data. Alternatively, if the SNR for the wireless signal is not better than the SNR for the RAN signal (e.g., the SNR for the wireless signal is less than the SNR for the RAN signal) and the RSSI for the wireless signal is better than the RSRP for the RAN signal (e.g., the RSSI for the wireless signal is less than the RSRP for the RAN signal), UE 105 may determine that the Wi-Fi latency data and Wi-Fi throughput data are not better than the RAN latency data and RAN throughput data.

Figure 1I:
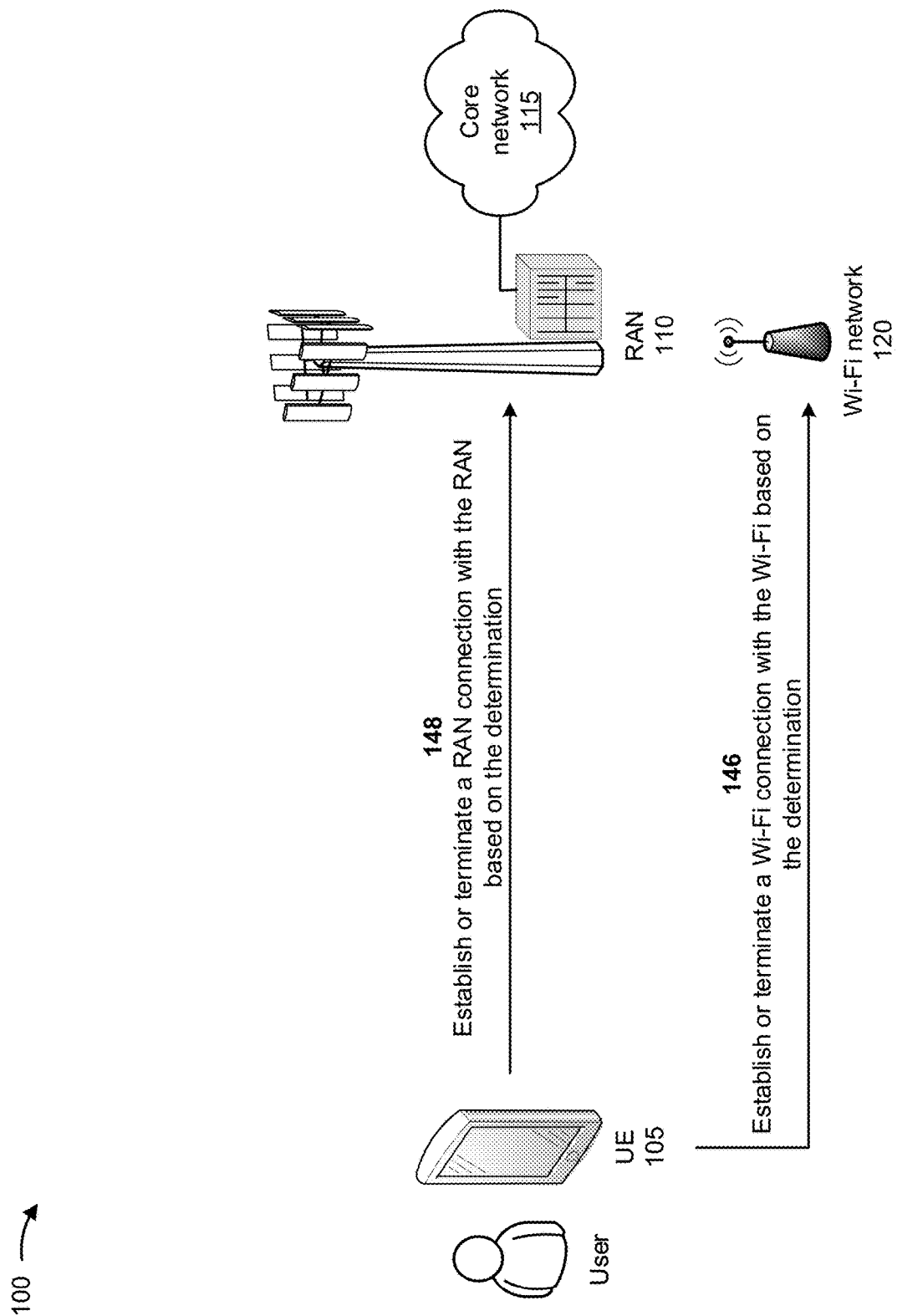

As shown in FIG. 1I, and by reference number 146, UE 105 may establish or terminate a Wi-Fi connection with Wi-Fi network 120 based on determining whether the Wi-Fi latency data and Wi-Fi throughput data are better than the RAN latency data and RAN throughput data. For example, UE 105 may establish the Wi-Fi connection with Wi-Fi network 120 (e.g., and terminate a RAN connection with RAN 110) when the Wi-Fi latency data and Wi-Fi throughput data are better than the RAN latency data and RAN throughput data. Alternatively, UE 105 may terminate the Wi-Fi connection with Wi-Fi network 120 (e.g., and establish a RAN connection with RAN 110) when the Wi-Fi latency data and Wi-Fi throughput data are not better than the RAN latency data and RAN throughput data.

As further shown in FIG. 1I, and by reference number 148, UE 105 may establish or terminate a RAN connection with RAN 110 based on determining whether the Wi-Fi latency data and Wi-Fi throughput data are better than the RAN latency data and RAN throughput data. For example, UE 105 may establish the RAN connection with RAN 110 (e.g., and terminate a Wi-Fi connection with Wi-Fi network 120) when the Wi-Fi latency data and Wi-Fi throughput data are not better than the RAN latency data and RAN throughput data. Alternatively, UE 105 may terminate the RAN connection with RAN 110 (e.g., and establish a Wi-Fi connection with Wi-Fi network 120) when the Wi-Fi latency data and Wi-Fi throughput data are better than the RAN latency data and RAN throughput data.

In some implementations, if UE 105 is connected to RAN 110, the wireless signal satisfies a threshold SNR and a threshold RSSI, and the Wi-Fi latency data and Wi-Fi throughput data are better than the RAN latency data and the RAN throughput data, UE 105 may terminate a RAN connection with RAN 110 and may establish a Wi-Fi connection with Wi-Fi network 120. Alternatively, if UE 105 is connected to Wi-Fi network 120, the RAN signal satisfies a threshold SNR and a threshold RSRP, and the RAN latency data and the RAN throughput data are better than the Wi-Fi latency data and the Wi-Fi throughput data, UE 105 may terminate a Wi-Fi connection with Wi-Fi network 120 and may establish a RAN connection with RAN 110.

Figure 1J:
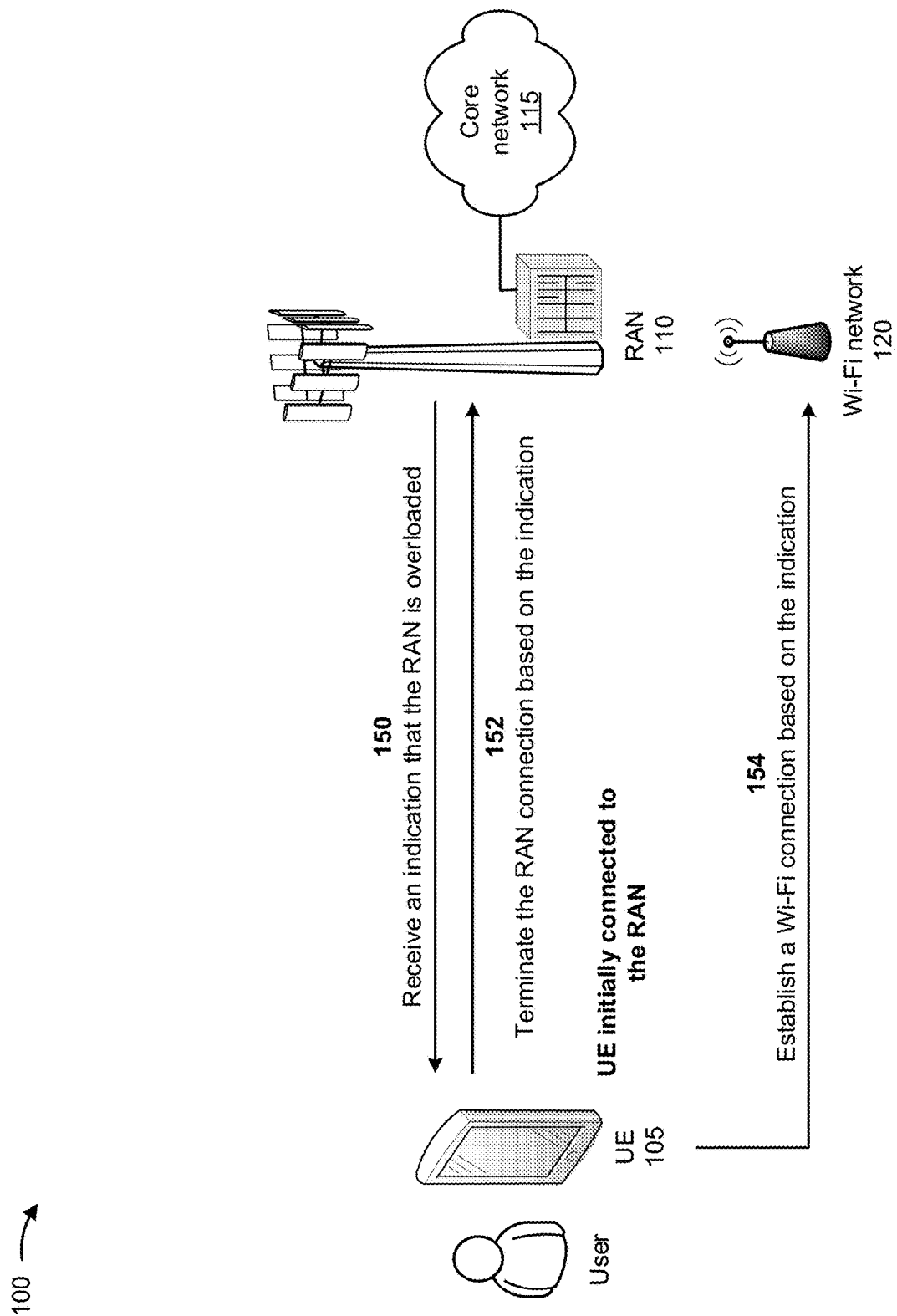

As shown in FIG. 1J, UE 105 may initially be connected to RAN 110 via a RAN connection. As further shown in FIG. 1J, and by reference number 150, UE 105 may receive an indication that RAN 110 is overloaded. In this case, and as further shown by reference number 152 in FIG. 1J, UE 105 may terminate the RAN connection with RAN 110 based on the indication that RAN 110 is overloaded. As shown by reference number 154 in FIG. 1J, UE 105 may establish a Wi-Fi connection with Wi-Fi network 120 based on the indication that RAN 110 is overloaded. In some implementations, RAN 110 may redirect UE 105 to Wi-Fi network 120 by providing, to UE 105, a system information block type2 (SIB2) message with access information that includes redirection data (e.g., a redirection bit) to Wi-Fi network 120. In some implementations, the access information may include a Wi-Fi service set identifier (SSID) that identifies Wi-Fi network 120. In such implementations, UE 105 may connect with Wi-Fi network 120 based on the redirection data.

Figure 1K:
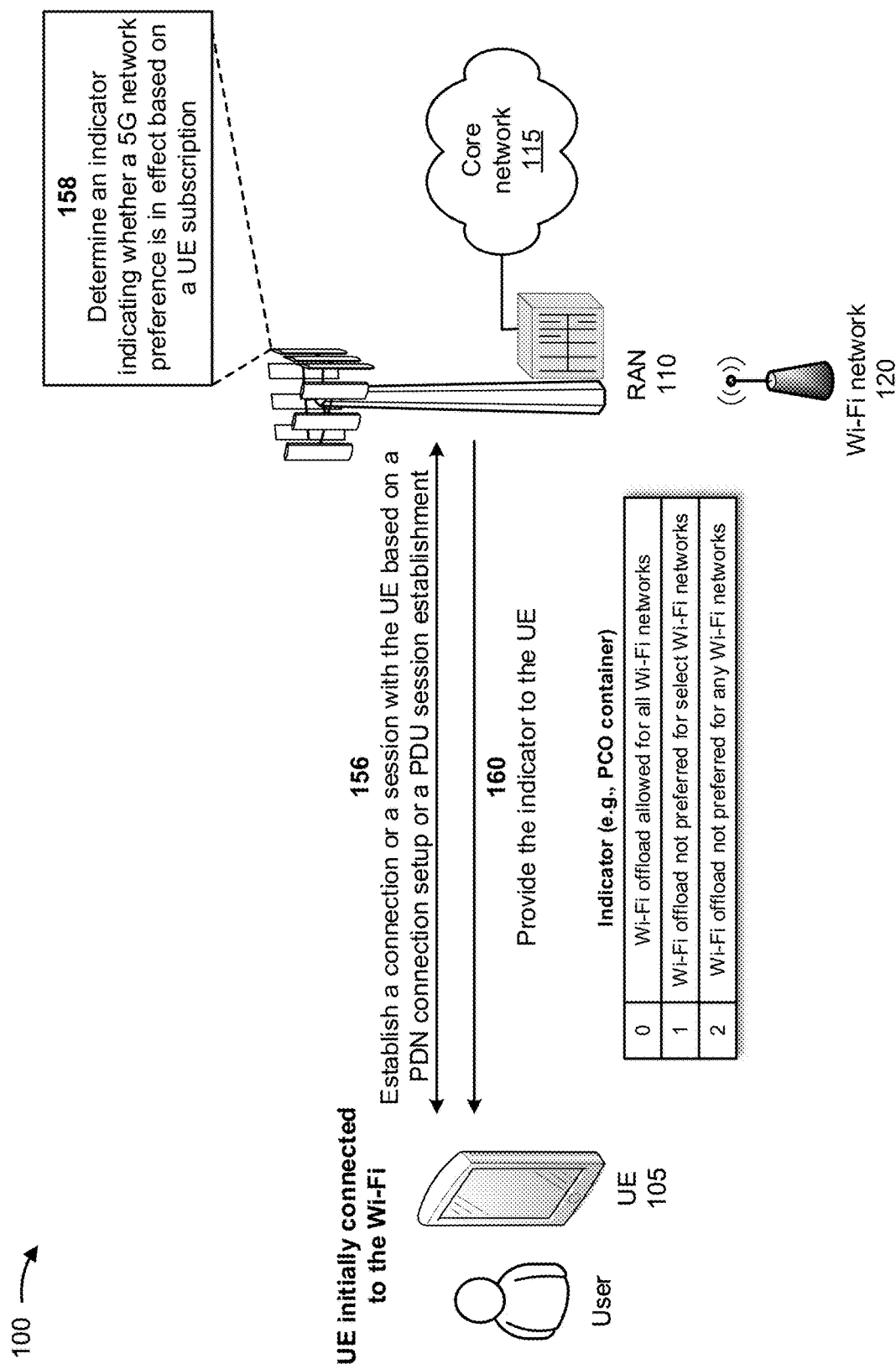

As shown in FIG. 1K, UE 105 may initially be connected to Wi-Fi network 120 via a Wi-Fi connection. As further shown in FIG. 1K, and by reference number 156, RAN 110 may establish a connection or a session with UE 105 based on a PDN connection setup or a PDU session establishment. For example, RAN 110 may utilize the PDN connection setup for LTE/5G NR NSA to establish the connection or the session with UE 105. Alternatively, RAN 110 may utilize the PDU session establishment for 5G NR SA to establish the connection or the session with UE 105.

As further shown in FIG. 1K, and by reference number 158, RAN 110 may determine an indicator indicating whether a 5G network preference is in effect based on a subscription of UE 105. For example, the subscription of UE 105 may be associated with a utilization of RAN 110 (e.g., based on a 5G price plan associated with UE 105). In some implementations, RAN 110 may provide the indicator in an operator reserved PCO container. In some implementations, the indicator may include one of a first integer value (e.g., "0") indicating that Wi-Fi offload is allowed for all Wi-Fi networks, a second integer value (e.g., "1") indicating that Wi-Fi offload is not preferred for particular Wi-Fi networks, or a third integer value (e.g., "2") indicating that Wi-Fi offload is not preferred for any Wi-Fi networks. When the indicator includes the second integer value (e.g., "1"), the indicator may further include a list of the particular Wi-Fi networks (e.g., a list of Wi-Fi networks for which Wi-Fi offload is not preferred).

As further shown in FIG. 1K, and by reference number 160, RAN 110 may provide the indicator to UE 105. For example, RAN 110 may provide the indicator to UE 105 via the operator reserved PCO container. In some implementations, RAN 110 may push the indicator, via the operator reserved PCO container, to UE 105 during the PDN connection setup (e.g., for LTE/5G NR NSA) with UE 105 or during the PDU session establishment (e.g., for 5G NR SA) with UE 105. In some implementations, RAN 110 may provide the indicator to UE 105 unsolicited (e.g., without UE 105 requesting the indicator).

Figure 1L:
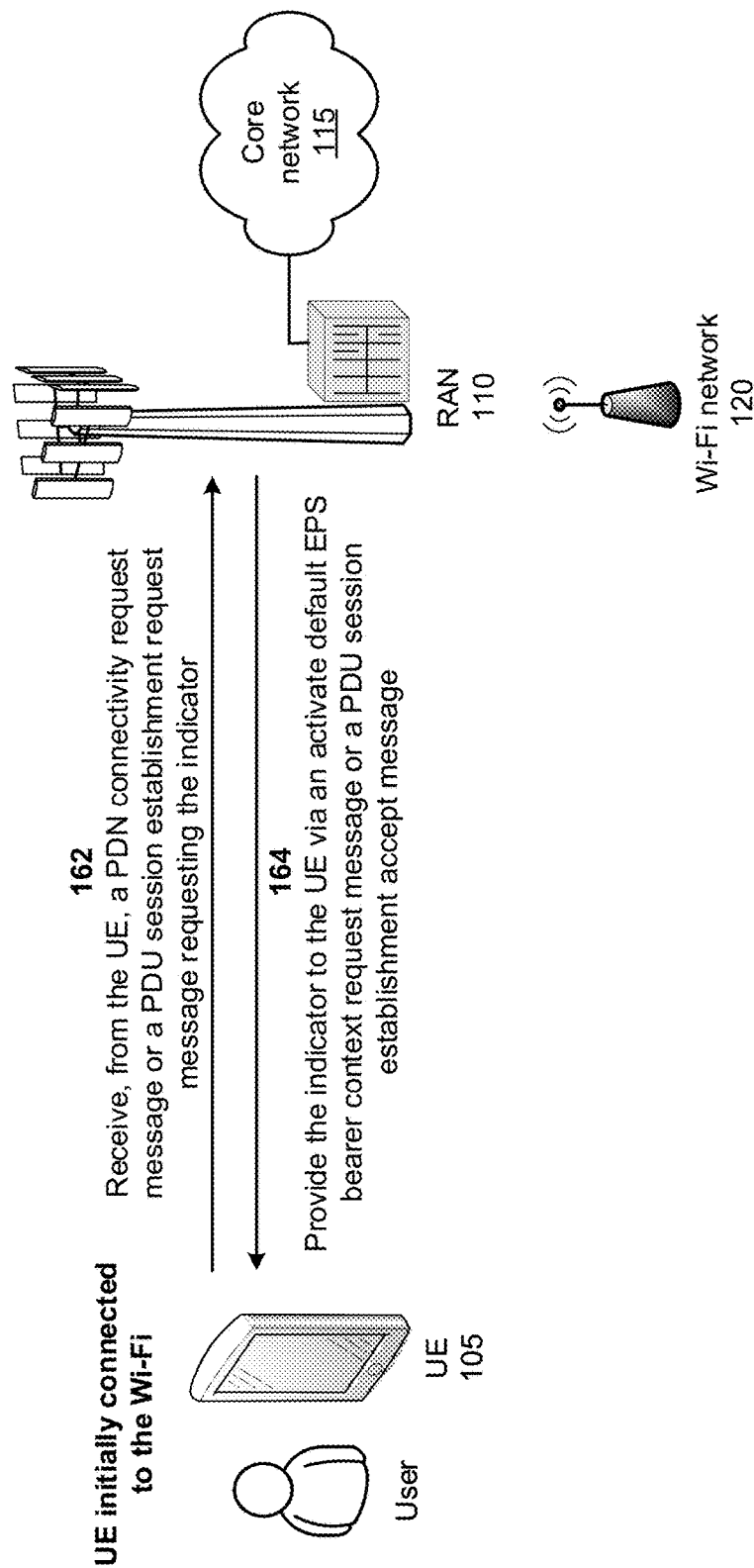

As shown in FIG. 1L, UE 105 may initially be connected to Wi-Fi network 120 via a Wi-Fi connection. As further shown in FIG. 1L, and by reference number 162, RAN 110 may receive, from UE 105, a PDN connectivity request message or a PDU session establishment request message requesting the indicator. For example, RAN 110 may receive the PDN connectivity request message for LTE/5G NR NSA or may receive the PDU session establishment request message for 5G NR SA. The indicator may include the features described above in connection with FIG. 1K.

As further shown in FIG. 1L, and by reference number 164, RAN 110 may provide the indicator to UE 105 via an activate default EPS bearer context request message or a PDU session establishment accept message. For example, RAN 110 may provide the indicator to UE 105 via the activate default EPS bearer context request message (e.g., for LTE/5G NR NSA) or via the PDU session establishment accept message (e.g., for 5G NR SA). In some implementations, RAN 110 may provide the indicator to UE 105 via the operator reserved PCO container and based on the PDN connectivity request message or the PDU session establishment request message received from UE 105.

Figure 1M:
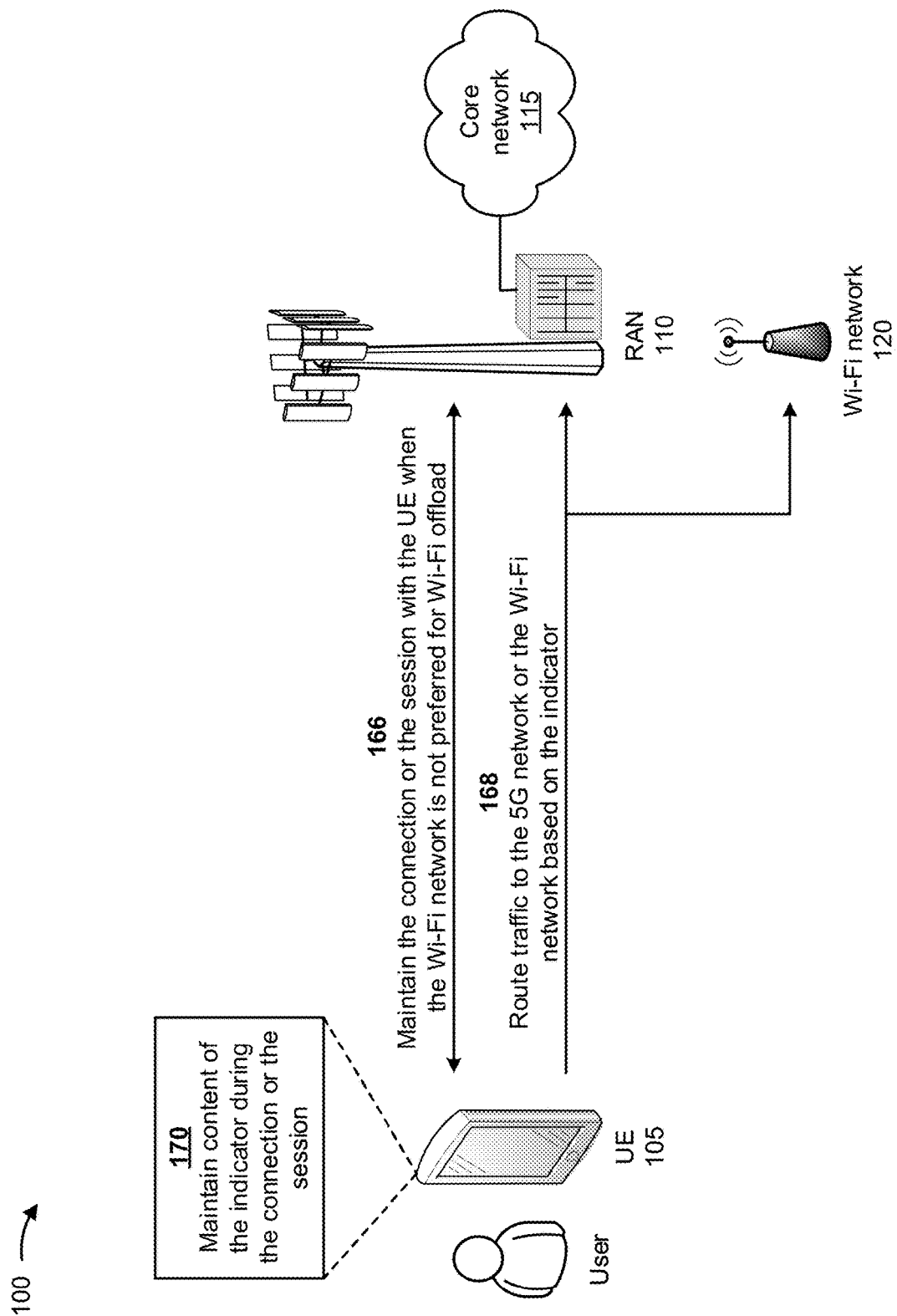

As shown in FIG. 1M, and by reference number 166, RAN 110 may maintain the connection or the session with UE 105 when Wi-Fi network 120 is not preferred for Wi-Fi offload. For example, if the indicator includes the second integer value (e.g., "1"), indicating that Wi-Fi offload is not preferred for particular Wi-Fi networks (e.g., which include Wi-Fi network 120), or the third integer value (e.g., "2"), indicating that Wi-Fi offload is not preferred for any Wi-Fi networks, RAN 110 may maintain the connection or the session with UE 105.

As further shown in FIG. 1M, and by reference number 168, UE 105 may route traffic to the 5G network (e.g., RAN 110 and/or core network 115) or Wi-Fi network 120 based on the indicator. For example, if the indicator includes the first integer value (e.g., "0"), indicating that Wi-Fi offload is allowed for all Wi-Fi networks, or the second integer value (e.g., "1"), indicating that Wi-Fi offload is not preferred for particular Wi-Fi networks (e.g., which do not include Wi-Fi network 120), UE 105 may route the traffic to Wi-Fi network 120. Alternatively, if the indicator includes the second integer value (e.g., "1"), indicating that Wi-Fi offload is not preferred for particular Wi-Fi networks (e.g., which include Wi-Fi network 120), or the third integer value (e.g., "2"), indicating that Wi-Fi offload is not preferred for any Wi-Fi networks, UE 105 may route the traffic to RAN 110.

As further shown in FIG. 1M, and by reference number 170, UE 105 may maintain (e.g., in storage) content of the indicator during the connection or the session. For example, UE 105 may store the indicator (e.g., the PCO container) for a lifetime of the connection or the session, including across transitions (e.g., transitions between LTE/5G NR NSA and 5G NR SA). Alternatively, UE 105 may store the indicator (e.g., the PCO container) beyond the lifetime of the connection or the session in which the indicator was received.

As shown in FIG. 1N, UE 105 may initially be connected to Wi-Fi network 120 via a Wi-Fi connection. As further shown in FIG. 1K, and by reference number 172, RAN 110 may determine a modified indicator indicating whether the 5G network preference is in effect based on the subscription of UE 105. The subscription of UE 105 may be associated with a utilization of RAN 110 (e.g., based on a 5G price plan associated with UE 105). In some implementations, RAN 110 may provide the modified indicator in an operator reserved PCO container. In some implementations, the modified indicator may include the features described above, in connection with FIG. 1K, for the indicator.

As further shown in FIG. 1N, and by reference number 174, RAN 110 may provide the modified indicator to UE 105 via a modified EPS bearer context request message or a PDU session modification command. For example, RAN 110 may provide the modified indicator to UE 105 via the modified EPS bearer context request message (e.g., for LTE/5G NR NSA) or via the PDU session modification command (e.g., for 5G NR SA). In some implementations, RAN 110 may provide the modified indicator to UE 105 via the operator reserved PCO container.

As further shown in FIG. 1N, and by reference number 176, UE 105 may route traffic to the 5G network (e.g., RAN 110 and/or core network 115) or Wi-Fi network 120 based on the modified indicator. For example, if the modified indicator includes the first integer value (e.g., "0"), indicating that Wi-Fi offload is allowed for all Wi-Fi networks, or the second integer value (e.g., "1"), indicating that Wi-Fi offload is not preferred for particular Wi-Fi networks (e.g., which do not include Wi-Fi network 120), UE 105 may route the traffic to Wi-Fi network 120. Alternatively, if the modified indicator includes the second integer value (e.g., "1"), indicating that Wi-Fi offload is not preferred for particular Wi-Fi networks (e.g., which include Wi-Fi network 120), or the third integer value (e.g., "2"), indicating that Wi-Fi offload is not preferred for any Wi-Fi networks, UE 105 may route the traffic to RAN 110.

In this way, the network device of RAN 110 instructs UE 105 to utilize RAN 110 instead of Wi-Fi network 120. For example, the network device may provide an indicator (e.g., via an operator reserved PCO container) to UE 105. The network device may push the indicator to UE 105 during a PDN connection setup for LTE/5G NR NSA and a PDU session establishment for 5G NR SA. UE 105 may request the operator reserved PCO container in a PDN connectivity request message (e.g., for LTE/5G NR NSA) or a PDU session establishment request message (e.g., for 5G NR SA). The network device may respond with an activate default EPS bearer context request message (e.g., for LTE/5G NR NSA) or a PDU session establishment accept message (e.g., for 5G NR SA). Thus, the network device and UE 105 best utilize available computing resources, networking resources, and/or the like that would otherwise be inefficiently utilized and consumed incorrectly routing traffic to Wi-Fi networks, overloading Wi-Fi networks, not enabling discovery and routing of traffic to RAN 110, and/or the like.

As indicated above, FIGS. 1A-1N are provided merely as examples. Other examples may differ from what is described with regard to FIGS. 1A-1N. The number and arrangement of devices and networks shown in FIGS. 1A-1N are provided as an example. In practice, there may be additional devices and/or networks, fewer devices and/or networks, different devices and/or networks, or differently arranged devices and/or networks than those shown in FIGS. 1A-1N. Furthermore, two or more devices shown in FIGS. 1A-1N may be implemented within a single device, or a single device shown in FIGS. 1A-1N may be implemented as multiple, distributed devices. Additionally, or alternatively, a set of devices (e.g., one or more devices) of FIGS. 1A-1N may perform one or more functions described as being performed by another set of devices of FIGS. 1A-1N.

Figure 2:
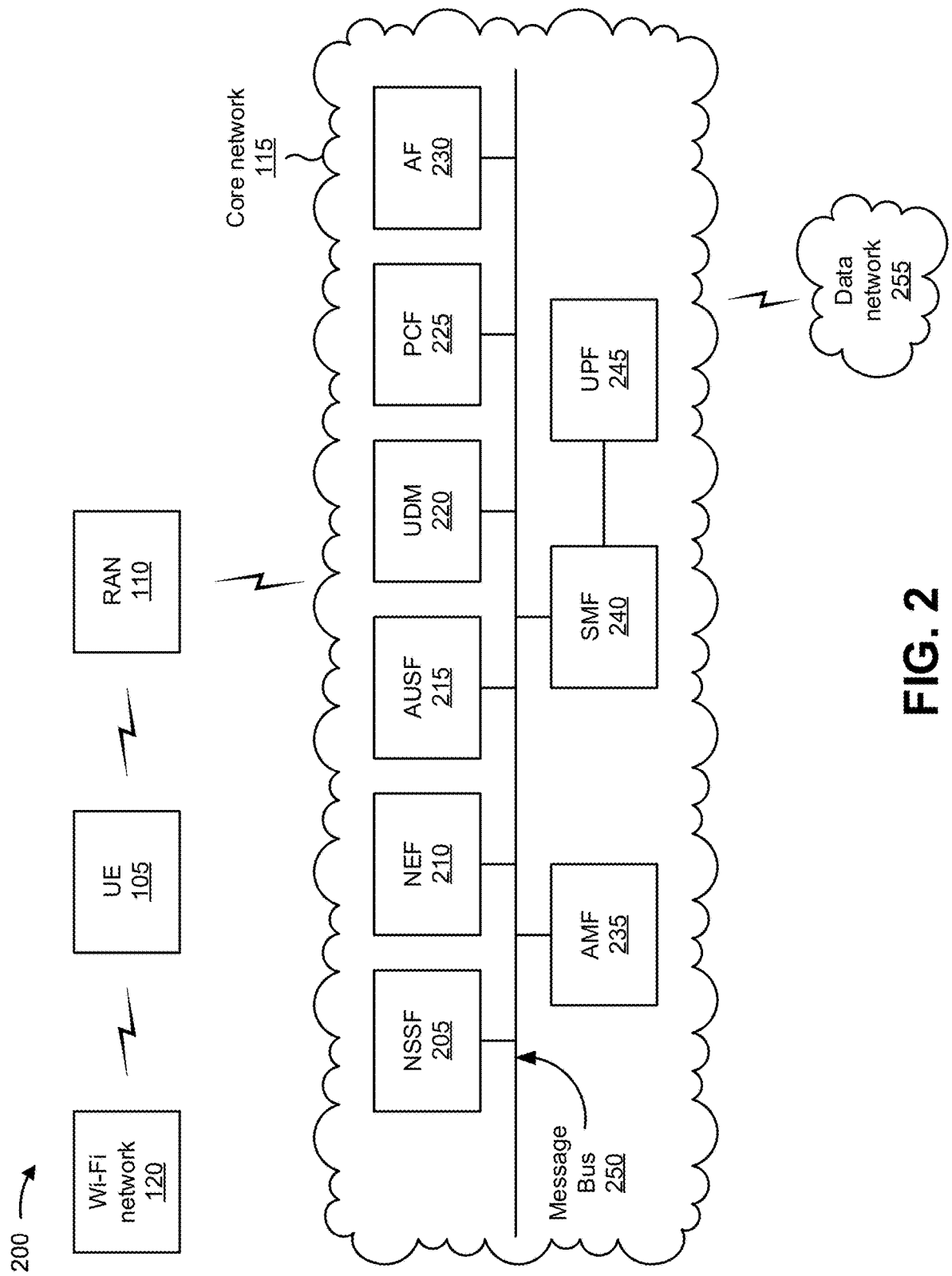
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include user equipment 105, RAN 110, core network 115, Wi-Fi network 120, and a data network 255. Devices and/or networks of example environment 200 may interconnect via wired connections, wireless connections, or a combination of wired and wireless connections.

User equipment 105 includes one or more devices capable of receiving, generating, storing, processing, and/or providing information, such as information described herein. For example, user equipment 105 can include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, and/or the like), a mobile hotspot device, a fixed wireless access device, customer premises equipment, an autonomous vehicle, or a similar type of device.

RAN 110 may support, for example, a cellular radio access technology (RAT). RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user equipment 105. RAN 110 may transfer traffic between user equipment 105 (e.g., using a cellular RAT), one or more base stations (e.g., using a wireless interface or a backhaul interface, such as a wired backhaul interface), and/or core network 115. RAN 110 may provide one or more cells that cover geographic areas.

In some implementations, RAN 110 may perform scheduling and/or resource management for user equipment 105 covered by RAN 110 (e.g., user equipment 105 covered by a cell provided by RAN 110). In some implementations, RAN 110 may be controlled or coordinated by a network controller, which may perform load balancing, network-level configuration, and/or the like. The network controller may communicate with RAN 110 via a wireless or wireline backhaul. In some implementations, RAN 110 may include a network controller, a self-organizing network (SON) module or component, or a similar module or component. In other words, RAN 110 may perform network control, scheduling, and/or network management functions (e.g., for uplink, downlink, and/or sidelink communications of user equipment 105 covered by RAN 110).

In some implementations, core network 115 may include an example functional architecture in which systems and/or methods described herein may be implemented. For example, core network 115 may include an example architecture of a fifth generation (5G) next generation (NG) core network included in a 5G wireless telecommunications system. While the example architecture of core network 115 shown in FIG. 2 may be an example of a service-based architecture, in some implementations, core network 115 may be implemented as a reference-point architecture.

As shown in FIG. 2, core network 115 may include a number of functional elements. The functional elements may include, for example, a network slice selection function (NSSF) 205, a network exposure function (NEF) 210, an authentication server function (AUSF) 215, a unified data management (UDM) component 220, a policy control function (PCF) 225, an application function (AF) 230, an access and mobility management function (AMF) 235, a session management function (SMF) 240, a user plane function (UPF) 245, and/or the like. These functional elements may be communicatively connected via a message bus 250. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 205 includes one or more devices that select network slice instances for user equipment 105. By providing network slicing, NSSF 205 allows an operator to deploy multiple substantially independent end-to-end networks potentially with the same infrastructure. In some implementations, each slice may be customized for different services.

NEF 210 includes one or more devices that support exposure of capabilities and/or events in the wireless telecommunications system to help other entities in the wireless telecommunications system discover network services.

AUSF 215 includes one or more devices that act as an authentication server and support the process of authenticating user equipment 105 in the wireless telecommunications system.

UDM 220 includes one or more devices that store user data and profiles in the wireless telecommunications system. UDM 220 may be used for fixed access, mobile access, and/or the like, in core network 115.

PCF 225 includes one or more devices that provide a policy framework that incorporates network slicing, roaming, packet processing, mobility management, and/or the like.

AF 230 includes one or more devices that support application influence on traffic routing, access to NEF 210, policy control, and/or the like.

AMF 235 includes one or more devices that act as a termination point for non-access stratum (NAS) signaling, mobility management, and/or the like.

SMF 240 includes one or more devices that support the establishment, modification, and release of communication sessions in the wireless telecommunications system. For example, SMF 240 may configure traffic steering policies at UPF 245, enforce user equipment IP address allocation and policies, and/or the like.

UPF 245 includes one or more devices that serve as an anchor point for intraRAT and/or interRAT mobility. UPF 245 may apply rules to packets, such as rules pertaining to packet routing, traffic reporting, handling user plane QoS, and/or the like.

Message bus 250 represents a communication structure for communication among the functional elements. In other words, message bus 250 may permit communication between two or more functional elements.

Data network 255 includes one or more wired and/or wireless data networks. For example, data network 255 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

Wi-Fi network 120 includes one or more devices on a local area network (LAN) that allows wireless capable devices (e.g., UE 105) and wired networks to connect to the LAN through a wireless standard, such as Wi-Fi, Bluetooth, and/or the like. Wi-Fi network 120 may include a radio transmitter and an antenna, which facilitate connectivity with UE 105 and the Internet or a network.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
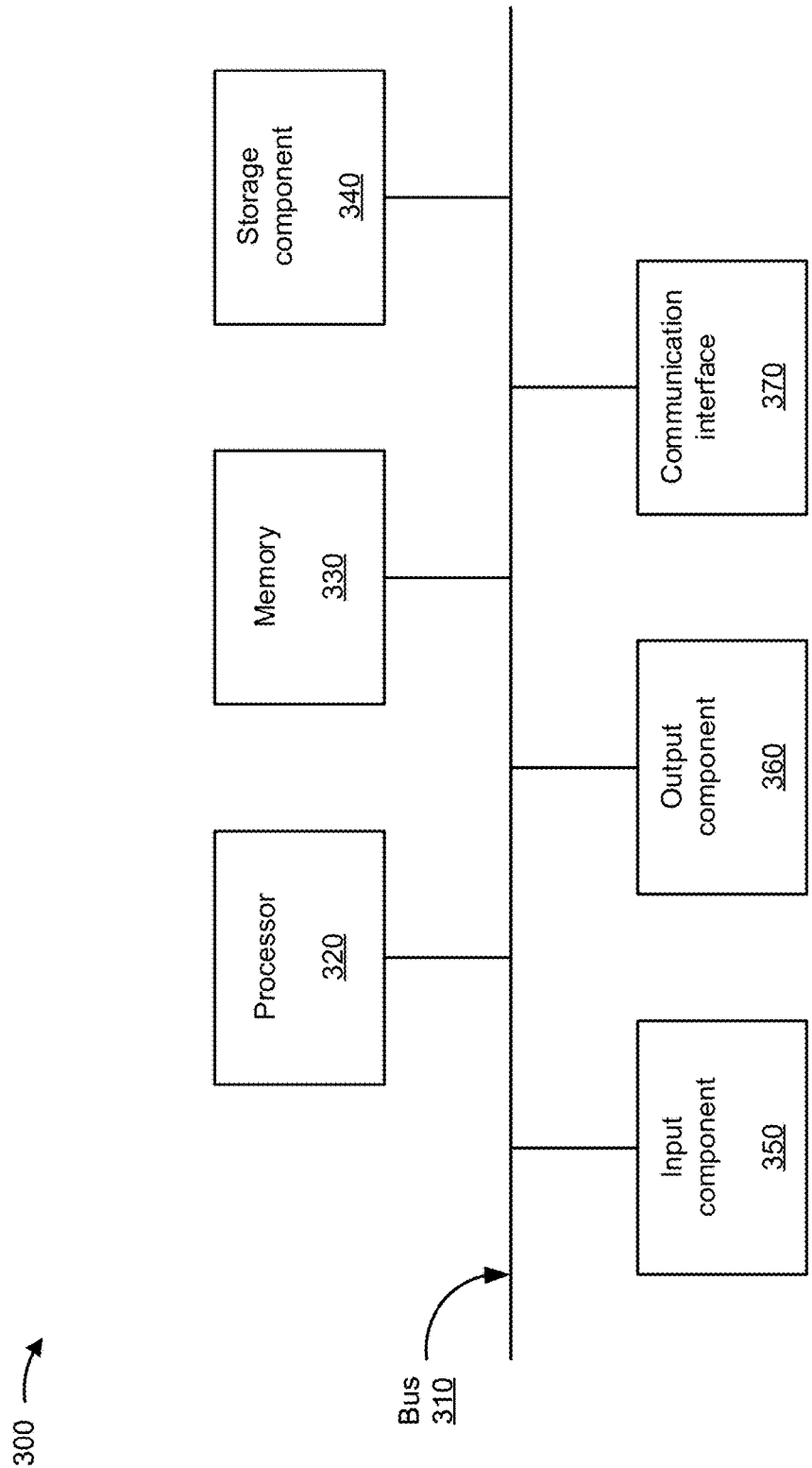
FIG. 3 is a diagram of example components of one or more devices of FIG. 2.

FIG. 3 is a diagram of example components of a device 300. Device 300 may correspond to UE 105, RAN 110, NSSF 205, NEF 210, AUSF 215, UDM 220, PCF 225, AF 230, AMF 235, SMF 240, and/or UPF 245. In some implementations, UE 105, RAN 110, NSSF 205, NEF 210, AUSF 215, UDM 220, PCF 225, AF 230, AMF 235, SMF 240, and/or UPF 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 for instructing a UE to utilize a 5G radio access network instead of a wireless network. In some implementations, one or more process blocks of FIG. 4 may be performed by a network device (e.g., a device of RAN 110). In some implementations, one or more process blocks of FIG. 4 may be performed by another device or a group of devices separate from or including the network device, such as a UE (e.g., UE 105). Additionally, or alternatively, one or more process blocks of FIG. 4 may be performed by one or more components of the device 300, such as the processor 320, the memory 330, the storage component 340, the input component 350, the output component 360, and/or the communication interface 370.

As shown in FIG. 4, process 400 may include establishing a connection or a session with a user equipment connected to a Wi-Fi network (block 410). For example, the network device may establish a connection or a session with a user equipment connected to a Wi-Fi network, as described above. In some implementations, establishing the connection or the session with the user equipment connected to the Wi-Fi network includes one of establishing the connection with the user equipment based on a packet data network connection setup, or establishing the session with the user equipment based on a protocol data unit session establishment. In some implementations, establishing the connection or the session with the user equipment connected to the Wi-Fi network includes receiving, from the user equipment, a packet data network connectivity request message requesting the indicator or a protocol data unit session establishment request message requesting the indicator, and establishing the connection or the session with the user equipment based on the packet data network connectivity request message or the protocol data unit session establishment request message, respectively.

As further shown in FIG. 4, process 400 may include determining an indicator indicating whether a 5G network preference is in effect based on a subscription of the user equipment (block 420). For example, the network device may determine an indicator indicating whether a 5G network preference is in effect based on a subscription of the user equipment, as described above. In some implementations, the indicator is included in a protocol configuration options container. In some implementations, the indicator includes one of a first integer value indicating that Wi-Fi offload is allowed for all Wi-Fi networks, a second integer value indicating that Wi-Fi offload is not preferred for particular Wi-Fi networks, or a third integer value indicating that Wi-Fi offload is not preferred for any Wi-Fi networks. In some implementations, when the indicator includes the second integer value, the indicator further includes a list of the particular Wi-Fi networks.

In some implementations, the subscription of the user equipment is associated with utilization of a 5G radio access network.

As further shown in FIG. 4, process 400 may include providing the indicator to the user equipment (block 430). For example, the network device may provide the indicator to the user equipment, as described above. In some implementations, providing the indicator to the user equipment includes providing the indicator to the user equipment via an activate default evolved packet system bearer context request message or a protocol data unit session establishment accept message.

As further shown in FIG. 4, process 400 may include maintaining the connection or the session with the user equipment when the indicator indicates that the Wi-Fi network is not preferred for Wi-Fi offload (block 440). For example, the network device may maintain the connection or the session with the user equipment when the indicator indicates that the Wi-Fi network is not preferred for Wi-Fi offload, as described above.

As further shown in FIG. 4, process 400 may include receiving traffic from the user equipment when the indicator indicates that the Wi-Fi network is not preferred for Wi-Fi offload (block 450). For example, the network device may receive traffic from the user equipment when the indicator indicates that the Wi-Fi network is not preferred for Wi-Fi offload, as described above. In some implementations, the traffic is not received from the user equipment when the indicator indicates that Wi-Fi offload is allowed for all Wi-Fi networks.

Process 400 may include additional implementations, such as any single implementation or any combination of implementations described below and/or in connection with one or more other processes described elsewhere herein.

In some implementations, process 400 includes determining a modified indicator indicating whether the 5G network preference is in effect based on the subscription of the user equipment, providing the modified indicator to the user equipment, and receiving additional traffic from the user equipment when the modified indicator indicates that the Wi-Fi network is not preferred for Wi-Fi offload. In some implementations, the additional traffic is not received from the user equipment when the modified indicator indicates that Wi-Fi offload is allowed for all Wi-Fi networks.

In some implementations, the modified indicator includes one of a first integer value indicating that Wi-Fi offload is allowed for all Wi-Fi networks, a second integer value indicating that Wi-Fi offload is not preferred for particular Wi-Fi networks, or a third integer value indicating that Wi-Fi offload is not preferred for any Wi-Fi networks. In some implementations, providing the modified indicator to the user equipment includes one of providing the modified indicator to the user equipment via a modified evolved packet system bearer context request message, or providing the modified indicator to the user equipment via a protocol data unit session modification command.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  establishing, by a network device of a fifth generation (5G) radio access network, a connection or a session with a user equipment connected to a Wi-Fi network;
  determining, by the network device, an indicator indicating whether a 5G network preference is in effect based on a subscription of the user equipment,
    wherein the indicator (i) includes an integer value indicating that Wi-Fi offload is not preferred for one or more particular Wi-Fi networks including the Wi-Fi network and (ii) a list of the one or more particular Wi-Fi networks;
  providing, by the network device, the indicator to the user equipment;
  maintaining, by the network device, the connection or the session with the user equipment when the indicator indicates that the Wi-Fi network is not preferred for Wi-Fi offload; and receiving, by the network device, traffic from the user equipment when the indicator indicates that the Wi-Fi network is not preferred for Wi-Fi offload.

2. The method of claim 1, wherein establishing the connection or the session with the user equipment connected to the Wi-Fi network comprises one of:
  establishing the connection with the user equipment based on a packet data network connection setup; or
  establishing the session with the user equipment based on a protocol data unit session establishment.

3. The method of claim 1, wherein establishing the connection or the session with the user equipment connected to the Wi-Fi network comprises:
  receiving, from the user equipment, a packet data network connectivity request message requesting the indicator or a protocol data unit session establishment request message requesting the indicator; and
  establishing the connection or the session with the user equipment based on the packet data network connectivity request message or the protocol data unit session establishment request message, respectively.

4. The method of claim 1, wherein providing the indicator to the user equipment comprises:
  providing the indicator to the user equipment via an activate default evolved packet system bearer context request message or a protocol data unit session establishment accept message.

5. The method of claim 1, wherein the indicator is included in a protocol configuration options container.

6. The method of claim 1, wherein the indicator is provided via an operator reserved protocol configuration options (PCO) container.

7. The method of claim 1, wherein the indicator instructs the user equipment to utilize the 5G radio access network instead of the Wi-Fi network.

8. A network device of a fifth generation (5G) radio access network, the network device comprising:
  one or more processors configured to:
    establish a connection or a session with a user equipment connected to a Wi-Fi network;
    determine an indicator indicating whether a 5G network preference is in effect based on a subscription of the user equipment,
      wherein the indicator includes (i) an integer value indicating that Wi-Fi offload is not preferred for one or more particular Wi-Fi networks including the Wi-Fi network and (ii) a list of the one or more particular Wi-Fi networks;
    provide the indicator to the user equipment, and
      wherein the indicator is included in a protocol configuration options container provided to the user equipment;
    maintain the connection or the session with the user equipment when the indicator indicates that the Wi-Fi network is not preferred for Wi-Fi offload; and
    receive traffic from the user equipment when the indicator indicates that the Wi-Fi network is not preferred for Wi-Fi offload,
      wherein the traffic is not received from the user equipment when the indicator indicates that Wi-Fi offload is allowed for all Wi-Fi networks.

9. The network device of claim 8, wherein the subscription of the user equipment is associated with utilization of the 5G radio access network.

10. The network device of claim 8, wherein the one or more processors are further configured to:

determine a modified indicator indicating whether the 5G network preference is in effect based on the subscription of the user equipment;
provide the modified indicator to the user equipment; and
receive additional traffic from the user equipment when the modified indicator indicates that the Wi-Fi network is not preferred for Wi-Fi offload.

11. The network device of claim 10, wherein the additional traffic is not received from the user equipment when the modified indicator indicates that Wi-Fi offload is allowed for the all Wi-Fi networks.

12. The network device of claim 10, wherein the modified indicator includes one of:
  a first integer value indicating that Wi-Fi offload is allowed for the all Wi-Fi networks,
  a second integer value indicating that Wi-Fi offload is not preferred for the one or more particular Wi-Fi networks, or
  a third integer value indicating that Wi-Fi offload is not preferred for any Wi-Fi networks.

13. The network device of claim 10, wherein the one or more processors, to provide the modified indicator to the user equipment, are configured to one of:
  provide the modified indicator to the user equipment via a modified evolved packet system bearer context request message; or
  provide the modified indicator to the user equipment via a protocol data unit session modification command.

14. The network device of claim 8, wherein the one or more processors, when establishing the connection or the session with the user equipment connected to the Wi-Fi network, are further configured to:
  establish the connection with the user equipment based on a packet data network connection setup; or
  establish the session with the user equipment based on a protocol data unit session establishment.

15. The network device of claim 8, wherein the one or more processors, when establishing the connection or the session with the user equipment connected to the Wi-Fi network, are further configured to:
  receive, from the user equipment, a packet data network connectivity request message requesting the indicator or a protocol data unit session establishment request message requesting the indicator; and
  establish the connection or the session with the user equipment based on the packet data network connectivity request message or the protocol data unit session establishment request message, respectively.

16. The network device of claim 8, wherein the indicator instructs the user equipment to utilize the 5G radio access network instead of the Wi-Fi network.

17. A non-transitory computer-readable medium storing a set of instructions, the set of instructions comprising:
  one or more instructions that, when executed by one or more processors of a network device of a fifth generation (5G) radio access network, cause the network device to:
    establish, with a user equipment connected to a Wi-Fi network, a connection based on a packet data network connection setup or a session based on a protocol data unit session establishment,
      wherein the one or more instructions, that cause the network device to establish the connection or the session with the user equipment, cause the network device to:
        receive, from the user equipment, a packet data network connectivity request message requesting an indicator indicating whether a 5G network preference is in effect based on a subscription of the user equipment or a protocol data unit session establishment request message requesting the indicator; and
establish the connection or the session with the user equipment based on the packet data network connectivity request message or the protocol data unit session establishment request message, respectively;
determine the indicator,
wherein the indicator (i) includes an integer value indicating that Wi-Fi offload is not preferred for one or more particular Wi-Fi networks including the Wi-Fi network and (ii) a list of the one or more particular Wi-Fi networks;
provide the indicator to the user equipment;
maintain the connection or the session with the user equipment when the indicator indicates that the Wi-Fi network is not preferred for Wi-Fi offload; and
receive traffic from the user equipment when the indicator indicates that the Wi-Fi network is not preferred for Wi-Fi offload.

18. The non-transitory computer-readable medium of claim 17, wherein the one or more instructions, that cause the network device to provide the indicator to the user equipment, cause the network device to:
provide the indicator to the user equipment via an activate default evolved packet system bearer context request message or a protocol data unit session establishment accept message.

19. The non-transitory computer-readable medium of claim 17, wherein content associated with the indicator is maintained in storage during the connection.

20. The non-transitory computer-readable medium of claim 17, wherein the one or more instructions further cause the network device to:
determine a modified indicator indicating whether the 5G network preference is in effect based on the subscription of the user equipment;
provide the modified indicator to the user equipment; and
receive additional traffic from the user equipment when the modified indicator indicates that the Wi-Fi network is not preferred for Wi-Fi offload.

\* \* \* \* \*